(12) United States Patent  (10) Patent No.: US 8,787,369 B2
Kim et al.  (45) Date of Patent: *Jul. 22, 2014

(54) APPARATUS FOR TRANSMITTING MAC PDU WITH A FRAGMENTATION AND PACKING EXTENDED HEADER AND METHOD THEREOF

(75) Inventors: Jeong Ki Kim, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 177 days.

This patent is subject to a terminal disclaimer.

(21) Appl. No.: 13/394,503

(22) PCT Filed: Nov. 18, 2010

(86) PCT No.: PCT/KR2010/008157
§ 371 (c)(1),
(2), (4) Date: Mar. 6, 2012

(87) PCT Pub. No.: WO2011/062425
PCT Pub. Date: May 26, 2011

(65) Prior Publication Data
US 2012/0163378 A1  Jun. 28, 2012

Related U.S. Application Data

(60) Provisional application No. 61/262,537, filed on Nov. 18, 2009, provisional application No. 61/262,531, filed on Nov. 18, 2009.

(30) Foreign Application Priority Data

Apr. 12, 2010  (KR) .................. 10-2010-0033169

(51) Int. Cl.
H04L 12/28 (2006.01)

(52) U.S. Cl.
USPC ................ 370/389; 370/395.1; 370/474

(58) Field of Classification Search
USPC .............. 370/230, 230.1, 231, 235, 238, 310, 370/355, 357, 389, 392, 394, 395.1, 395.3, 370/470, 473, 474, 476
See application file for complete search history.

(56) References Cited

U.S. PATENT DOCUMENTS 6,950,399 B1  9/2005  Bushmitch et al.
7,340,182 B2  3/2008  Kwon et al.
(Continued)

FOREIGN PATENT DOCUMENTS

EP  1 610 522 A1  12/2005
EP  1 594 284 B1  8/2008
(Continued)

OTHER PUBLICATIONS

Anil Agiwal et al., "Harmonised AWD Text on MAC PDU Formats," IEEE C802.16m-09/1173r1, pp. 1-10, May 5, 2009.
Jaesun Cha et al., "Definition of Extended Header Types (15.2.2.2)," IEEE C802.16m-09/1805, pp. 1-3, Aug. 29, 2009.
Jeongki Kim et al., "Proposed Text Related to Compact MAC Header for the IEEE 802.16m (15.2.2.1.2/15.2.12.2)," IEEE C802.16m-09/2407, pp. 1-6, Nov. 6, 2009.
Kiseon Ryu et al., "Proposed Text Related to Signaling Header for the IEEE 802.16m Amendment," IEEE C802.16m-09/1987r2, pp. 1-5, Sep. 18, 2009.
Kiseon Ryu et al., "Proposed Text Related to Signaling Header for the IEEE 802.16m Amendment," IEEE C802.16m-09/1987r3, pp. 1-5, Sep. 18, 2009.
Xiao Xu et al., "Compressed MAC PDU Overhead," IEEE C802.16maint-08/011r3, pp. 1-5, Jan. 21, 2008.

Primary Examiner — Kevin Mew
(74) Attorney, Agent, or Firm — Birch, Stewart, Kolasch & Birch, LLP

(57) ABSTRACT

A method of transmitting data in a transmitting stage is disclosed. The present invention includes configuring a MAC PDU (medium access control protocol data unit) including fragmented data and a fragmentation extended header (FEH) and a packing extended header (PEH) for transmitting the fragmented data and transmitting the configured MAC PDU to a receiving stage. Preferably, the FEH or the PEH includes an extended header type field indicating a type of an extended header and a fragmentation control field including information on the fragmented data.

13 Claims, 11 Drawing Sheets

(56) References Cited

U.S. PATENT DOCUMENTS

| | | |
|---|---|---|
| 7,430,182 B2 * | 9/2008 | Kwon et al. .................. 370/310 |
| 8,261,074 B2 * | 9/2012 | Raju et al. ..................... 713/168 |
| 8,279,890 B2 * | 10/2012 | Marinier et al. ............. 370/465 |
| 8,300,663 B2 * | 10/2012 | Chion et al. .................. 370/474 |
| 8,467,363 B2 * | 6/2013 | Lea et al. ...................... 370/338 |
| 2004/0184426 A1 | 9/2004 | Tan |
| 2007/0206600 A1 * | 9/2007 | Klimker et al. ............... 370/394 |
| 2008/0285567 A1 | 11/2008 | Guo |
| 2009/0122734 A1 * | 5/2009 | Kim et al. ..................... 370/310 |
| 2009/0213778 A1 * | 8/2009 | Tao et al. ...................... 370/315 |
| 2009/0245282 A1 | 10/2009 | Jung et al. |
| 2011/0110343 A1 * | 5/2011 | Venkatachalam et al. .... 370/338 |
| 2011/0145561 A1 | 6/2011 | Anil |
| 2011/0205945 A1 * | 8/2011 | Cave et al. .................... 370/310 |
| 2012/0170509 A1 * | 7/2012 | Lee et al. ...................... 370/315 |
| 2013/0028155 A1 * | 1/2013 | Zang et al. .................... 370/310 |
| 2013/0039273 A1 * | 2/2013 | Lee et al. ...................... 370/328 |

FOREIGN PATENT DOCUMENTS

| | | |
|---|---|---|
| JP | 2008-289159 A | 11/2008 |
| KR | 10-2008-0052000 A | 6/2008 |
| KR | 10-0918435 A | 9/2009 |
| WO | WO 2009/091011 A1 | 7/2009 |

* cited by examiner

Extended Header Group Format

APPARATUS FOR TRANSMITTING MAC PDU WITH A FRAGMENTATION AND PACKING EXTENDED HEADER AND METHOD THEREOF

CROSS REFERENCE TO RELATED APPLICATIONS

This application is the National Phase of PCT/KR2010/008157 filed on Nov. 18, 2010, which claims the benefit under 35 U.S.C. 119(e) of U.S. Provisional Application Nos. 61/262,531 and 61/262,537 filed on Nov. 18, 2009, and claims priority under 35 U.S.C. 119 (a) to patent application No. 10-2010-0033169 filed in Republic of Korea on Apr. 12, 2010, all of which are hereby expressly incorporated by reference into the present application.

TECHNICAL FIELD

The present invention relates to a mobile communication system, and more particularly, to an apparatus for transmitting MAC PDU (medium access control protocol data unit) with a fragmentation & packing extended header and method thereof. Although the present invention is suitable for a wide scope of applications, it is particularly suitable for configuring the MAC PDU with the fragmentation & packing extended header.

BACKGROUND ART

Generally, an internet based communication system includes a protocol stack consisting of five layers. And, a configuration of each protocol layer is shown in FIG. 1.

FIG. 1 is a diagram for one example of an internet protocol stack used in general.

Referring to FIG. 1, an internet protocol stack consists of an application layer (i.e., a most upper layer), a transport layer, a network layer, a link layer and a physical layer in order. The application layer is the layer for supporting such a network application as FTP (File Transfer Protocol), HTTP (Hypertext Transfer Protocol, TCP (Transmission Control Protocol), UDP (User Datagram Protocol) and the like. The transport layer is the layer responsible for an inter-host data transport function using TCP/UDP. The network layer is the layer for setting a data transport path from a source to a destination via the transport layer and IP protocol. The link layer is the layer responsible for data transmission between neighbor network entities and MAC (medium access control) via PPP/Ethernet protocol and the like. And, the physical layer is a lowest layer for performing a data transmission by a bit unit using a wire/wireless medium.

FIG. 2 is a diagram for operation of each layer for data transmission used in general.

Referring to FIG. 2, a transport layer of a transmitting side generates a new data unit by adding header information H+ to a message payload M received from an application layer that is an upper layer. The transport layer transfers the new data unit to a network layer that is a lower layer. The network layer generates a new data unit by adding header information Hn used by the network layer to the data received from the transport layer and then transfers this data unit to a link layer that is a lower layer.

Subsequently, the link layer generates a new data unit by adding header information H1 used by the link layer to the data received from the upper layer and then transfers it to a physical layer that is a lower layer. The physical layer transfers the data unit received from the link layer to a receiving side.

Meanwhile, a physical layer of the receiving side receives the data unit from the transmitting side and then transfers the received data unit to a link layer that is an upper layer of the physical layer. The receiving side processes a header added to each layer and then transfers the header removed message payload to an upper layer. Through this process, data transceiving is performed between the transmitting side and the receiving side.

For the data transceiving between the transmitting side and the receiving side, as shown in FIG. 2, each layer adds a protocol header and then performs such a control function as data addressing, routing, forwarding, data retransmission and the like.

FIG. 3 is a diagram of a protocol layer model defined in a wireless mobile communication system based on IEEE 802.16 system used in general.

Referring to FIG. 3, a MAC layer belonging to a link layer can consist of three sublayers.

First of all, a service-specific convergence sublayer (service-specific CS) modifies external network data received via a convergence sublayer service access point (CS SAP) into MAC SDUs (service data units) of a MAC sublayer (common part sublayer: CPS) or maps the corresponding data. This layer can include a function of sorting SDUs of external network and then linking a corresponding MAC service flow identifier (SFID) with a connection identifier (CID).

Secondly, a MAC CPS is a layer of providing such a core function of the MAC as system access, bandwidth allocation, connection setting and management and the like. The MAC CPS receives data sorted by a specific MAC connection from various convergence sublayers via the MAC SAP. In this case, a QoS (quality of service) is applicable to the data transmission and scheduling via a physical layer.

Thirdly, a security sublayer is able to provide such a function as authentication, security key exchange and encryption.

The MAC layer is a connection-oriented service and is implemented with the concept of transport connection. When a mobile station registers with a system, a service flow can be provided by a negotiation between a mobile station and a system. If a service request is changed, a new connection can be set. In this case, the transport connection defines mapping between peer convergence processes using MAC and service flow. And, the service flow defines QoS parameters of MAC PDU exchanged in the corresponding connection.

The service flow on the transport connection plays a core role in managing and operating the MAC protocol and provides a mechanism for uplink and downlink QoS managements. In particular, service flows can be combined with a bandwidth allocation process.

In the general IEEE 802.16 system, a mobile station is able to have a 48-bit universal MAC address for each radio interface. This address uniquely defines a radio interface of a mobile station and is usable to set an access of the mobile station during an initial ranging process. Since a base station verifies mobile stations using different identifiers (ID) of the mobile stations, respectively, the universal MAC address is usable as a portion of an authentication process.

Each connection can be identified by a 16-bit connection identifier (CID). While initialization of a mobile station is in progress, two management connection pairs (i.e., uplink and downlink) are established between a mobile station and a base station. And, three pairs including the management connections are selectively usable.

In order for a transmitting stage and a receiving stage to exchange data with each other in the above described layer structure, assume a case of transmitting MAC SDUs (medium access control service data units). In this case, the MAC SDU is processed into MAC PDU (medium access control packet data unit). In order to generate such a MAC PDU, a base station or a mobile station enables a MAC header to be included in the corresponding MAC PDU.

DISCLOSURE OF INVENTION

Technical Problem

Generally, in case of applying segmentation, packing or automatic retransmit request (ARQ) to a packet to transmit, it is able to use a fragmentation & packing extended header among extended headers to enable relevant information to be included in a corresponding MAC PDU.

In this case, in case that data is generated in predetermined periodicity like VoIP (voice over internet protocol) to have a fixed small size, a compact MAC header (CMH) is used. And, the data is generally transmitted without having segmentation or packing applied thereto.

However, such a packet as VoIP is transmittable by having segmentation applied thereto in a poor channel situation. In doing so, if a fragmentation & packing extended header including all information on segmentation, packing and sequence number is used, it causes a problem that a header overhead increases in general.

Solution to Problem

Accordingly, the present invention is directed to an apparatus for transmitting MAC PDU (medium access control protocol data unit) with a fragmentation & packing extended header and method thereof that substantially obviate one or more of the problems due to limitations and disadvantages of the related art.

An object of the present invention is to provide a method of configuring an efficient segmentation & packing extend header including necessary information only according to a type or transmission scheme of a packet to transmit and a method of transmitting a signal using the configured fragmentation & packing extended header.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting data, which is transmitted by a transmitting stage, includes the steps of configuring a MAC PDU (medium access control protocol data unit) including segmented data and a fragmentation extended header (FEH) or a packing extended header (PEH) for transmitting the segmented data and transmitting the configured MAC PDU to a receiving stage. In this case, the FEH or the PEH includes an extended header type field indicating a type of an extended header and a fragmentation control field including information on the segmented data.

Preferably, if the data is a packet generated in a prescribed fixed size with a prescribed periodicity, a MAC header included in the MAC PDU includes a short-packet MAC header (SPMH) for transmitting the data.

More preferably, the SPMH includes at least one selected from the group consisting of a flow identifier field including a service flow identifier (Flow ID) used for the MAC PDU transmission, an extended header presence indicator field indicating a presence or non-presence of the extended header in the MAC PDU, a length field including length information of the MAC PDU and a first sequence number field indicating a sequence number of the MAC PDU.

More preferably, a size of the FEH is 1 byte and the FEH includes the extended header type field of 4 bits and the fragmentation control field of 2 bits only.

Preferably, if a MAC header included in the MAC PDU is an AGMH, the FEH further includes a second sequence number field indicating a sequence number of the MAC PDU.

More preferably, the PEH is included the MAC PDU when a MAC header of the MAC PDU is an AGMH, Wherein the PEH further includes a second sequence number field indicating a sequence number of the MAC PDU, a length field indicating length information of non-fragmented data or the fragmented data and a field indicating whether another information is included.

Preferably, if an extended header group including at least one extended header is included in the MAC PDU, the MAC PDU further includes an extended header group field indicating a length of the extended header group.

To further achieve these and other advantages and in accordance with the purpose of the present invention, a method of receiving data, which is received by a receiving stage, includes the steps of receiving a MAC PDU (medium access control protocol data unit) including segmented data and a fragmentation extended header (FEH) or a packing extended header (PEH) for transmitting the segmented data and decoding the received MAC PDU. In this case, the FEH or the PEH includes an extended header type field indicating a type of an extended header and a fragmentation control field including information on the segmented data.

To further achieve these and other advantages and in accordance with the purpose of the present invention, a transmitter for transmitting data includes a processor configuring a MAC PDU (medium access control protocol data unit) and a transmitting module configured to transmit the MAC PDU. In this case, the processor configures the MAC PDU including segmented data and a fragmentation extended header (FPEH) or a packing extended header (PEH) for transmitting the segmented data, the processor controls the transmitting module to transmit the configured MAC PDU to a receiver, and the FEH or the PEH includes an extended header type field indicating a type of an extended header and a fragmentation control field including information on the segmented data.

To further achieve these and other advantages and in accordance with the purpose of the present invention, a receiver for receiving data includes a receiving module configured to receive a MAC PDU (medium access control protocol data unit) and a processor configured to perform a signal processing operation on the received MAC PDU. In this case, the MAC PDU includes segmented data and a fragmentation extended header (FPEH) or a packing extended header (PEH) for transmitting the segmented data and the FEH or the PEH includes an extended header type field indicating a type of an extended header and a fragmentation control field including information on the segmented data.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, the present invention configures an efficient segmentation & packing extend header including necessary information only according to a type or transmission scheme of a packet to transmit.

Secondly, the present invention configures an efficient fragmentation & packing extended header, thereby reducing header overhead, transmission power and the like.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
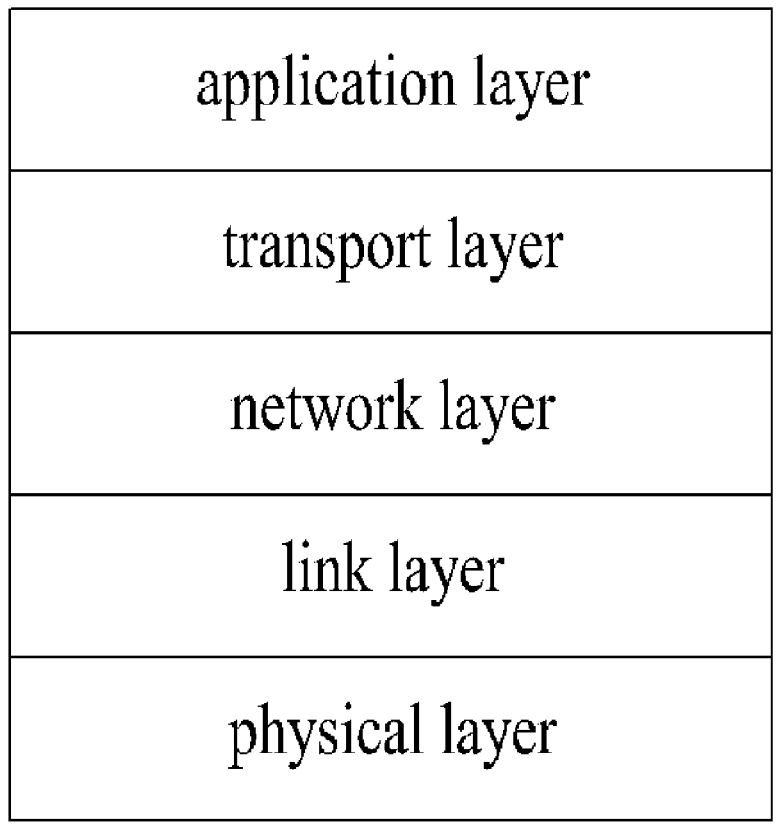
FIG. 1 is a diagram for one example of an internet protocol stack used in general.
Figure 2:
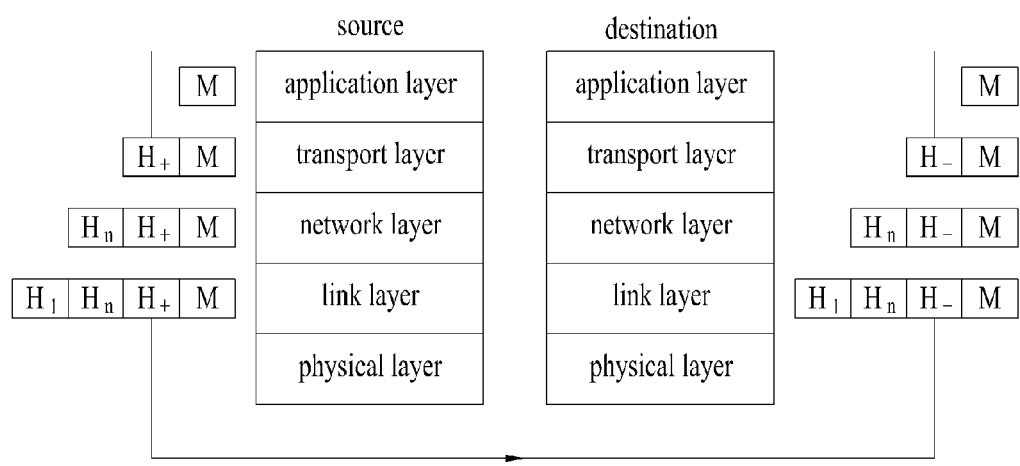
FIG. 2 is a diagram for operation of each layer for data transmission used in general.
Figure 3:
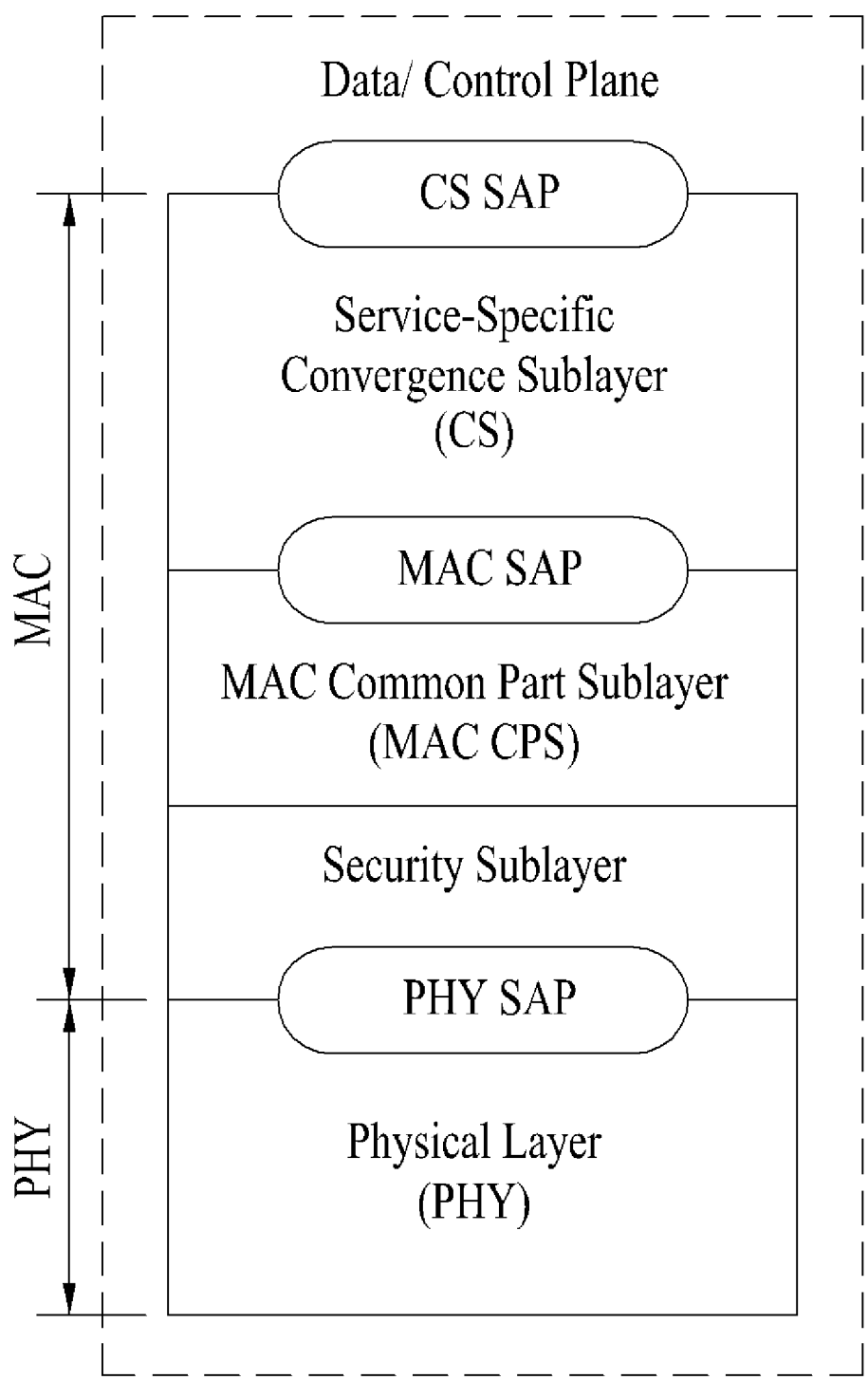
FIG. 3 is a diagram of a layer structure of a general IEEE 802.16 system.

Reference will now be made in detail to the preferred embodiments of the present invention, examples of which are illustrated in the accompanying drawings.

The present invention relates to MAC headers for efficient data transmissions in a wireless communication.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this disclosure, embodiments of the present invention are described centering on the data transmission/reception relations between a base station and a mobile station. In this case, the base station is meaningful as a terminal node of a network which directly performs communication with the mobile station. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an advanced base station (ABS), an access point and the like. And, 'mobile station (MS)' can be replaced by such a terminology as a user equipment (UE), a subscriber station (SS), a mobile subscriber station (MSS), an advanced mobile station (AMS), a mobile terminal, a terminal and the like.

Moreover, a transmitting stage means a stationary and/or mobile node that transmits a data service or a speech service. And, a receiving stage means a stationary and/or mobile node that receives a data service or a speech service. Hence, a mobile station can become a transmitting stage and a base station can become a receiving stage, in uplink. Likewise, a mobile station becomes a receiving stage and a base station can become a transmitting stage, in downlink.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents.

Moreover, embodiments of the present invention can be supported by at least one of P802.16-2004, P802.16e-2005, P802.16Rev2 and P802.16m documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention.

In the following description, specific terminologies used for embodiments of the present invention are provided to help the understanding of the present invention. And, the use of the specific terminology can be modified into another form within the scope of the technical idea of the present invention.

Figure 4:
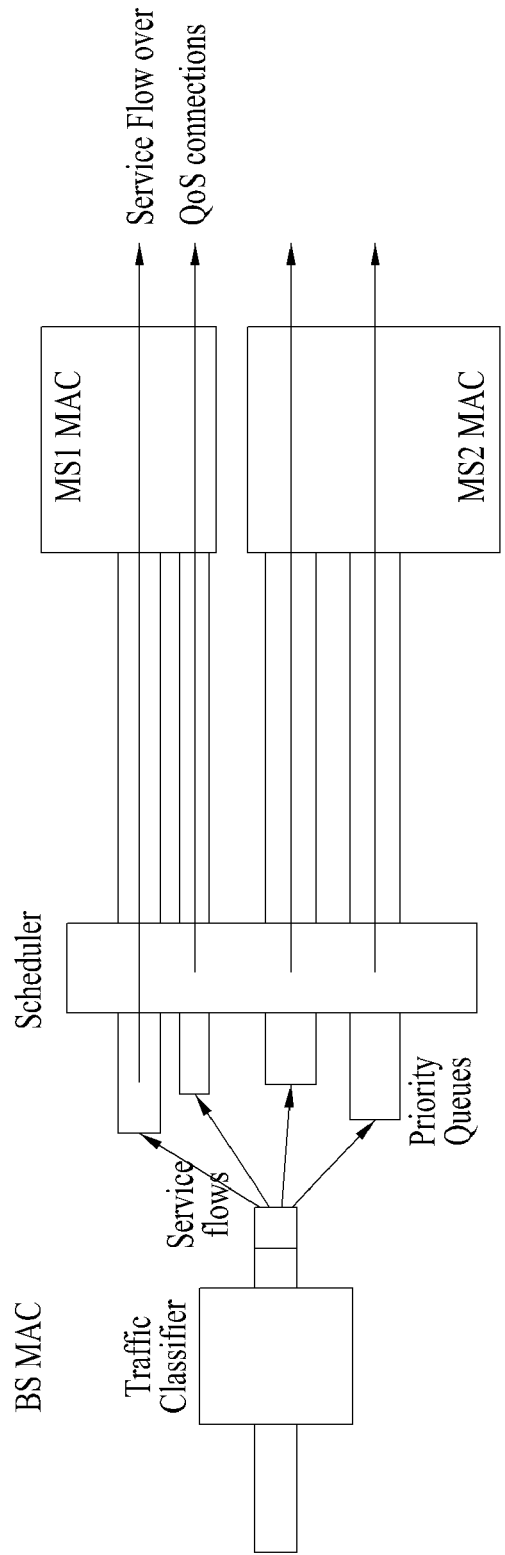
FIG. 4 is a diagram of a connection and service flow (SF) used by an IEEE 802.16 system.

FIG. 4 is a diagram of a connection and service flow (SF) used by an IEEE 802.16 system.

Referring to FIG. 4, in order to provide QoS of an upper service flow (SF), a logical connection of a MAC layer maps an SF to a logical connection for which a QoS parameter is defined. And, the logical connection is defined to provide QoS in a MAC layer through appropriate scheduling for data transmission of the corresponding connection. Types of connections defined in the MAC layer include a management connection allocated per mobile station for mobile station management in the MAC layer and a transport connection mapped to a service flow for upper service data transport.

Figure 5:
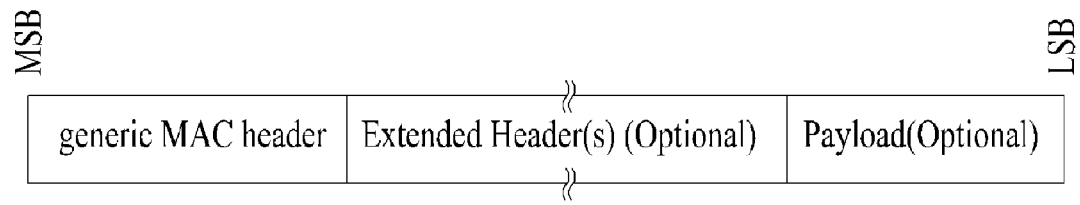
FIG. 5 is a diagram for one example of a MAC PDU (protocol data unit) type defined in a wireless MAN mobile communication system based on IEEE 802.16 system used in general.

FIG. 5 is a diagram for one example of a MAC PDU (protocol data unit) type defined in a wireless MAN mobile communication system based on IEEE 802.16 system used in general.

In general, in a link layer below a second layer (i.e., a link layer or a MAC layer) and a physical layer, a header format of MAC PDU is defined different according to a protocol of such a system as LAN, Wireless LAN, 3GPP, 3GPP2, Wireless MAN and the like. MAC header contains a MAC or link address of a node for inter-node data forwarding in the link layer and is able to contain header error check and link layer control information.

Referring to FIG. 5, each MAC PDU starts with a MAC header of a predetermined length. The MAC header is located ahead of a payload of the MAC PDU. The MAC PDU can include at least one extended header. The extended header is located behind the MAC header. In case that the extended header is included, the payload is located behind a header part including the MAC header and the at least one extended header by being encrypted.

The payload of the MAC PDU can include a subheader, a MAC SDU and a segmented MAC SDU. In case that one MAC SDU/PDU is segmented into a plurality of sub-MAC SDU/PDU by smaller unit, it is called fragmentation. And, the segmented data is called a fragment. And, a length of payload information is changeable to represent a variable byte size. Accordingly, the MAC sublayer is able to transmit various traffic types of an upper layer without recognizing a format or bit pattern of a message.

Besides, a cyclic redundancy check (CRC) for error detection can be included in the MAC PDU [not shown in FIG. 5].

There are MAC headers of three types. In particular, they include an advanced generic MAC header (AGMH), a short-packet MAC header (SPMH) for supporting such an application as VoIP, and a MAC signaling header for such a control as a bandwidth request and the like. In this case, each of the AGMH and the SPMH has a payload located behind a header, whereas the MAC signaling header does not have a payload located behind a header.

The AGMH is located a start part of DL/UL MAC PDU including data of a MAC control message and a convergence layer (CS).

Table 1 shows one example of an advanced generic MAC header (AGMH) structure used in a wireless communication system based on IEEE 802.16 system.

TABLE 1

| Syntax | Size(bit) | Notes |
|---|---|---|
| Advanced Generic MAC header( ){ | | |
| Flow ID | 4 | Flow Identifer |
| EH | 1 | Extended header presence indicator; When set to '1', this field indicates that an Extended Header is present following this GMH. |
| Length | 11 | This field indicates the length in bytes of MAC PDU including the GMH and extended header if present. |
| } | | |

Referring to Table 1, an AGMH includes a flow identifier field (Flow ID) having a flow identifier of a service indicating that the MAC header is an AGMH, an extended header presence indicator (EH) indicating whether a MAC PDU is accompanied by an extended header, and a length field (Length) including length information of the MAC PDU. When 1 bit is allocated to the extended header presence indicator field, if the corresponding field is set to 1, this field indicates that the extended header is included. If the corresponding field is set to 0, this field indicates that the extended header is not included. The length field (Length) indicates length information of the MAC PDU including the extended header if the extended header is present. The length field indicates the length in bytes. And, 11 bits are allocated to the length field. Referring to Table 1, the AGMH includes a 4-bit flow identifier field, a 1-bit extended header presence indicator field and an 11-bit length field. And, the AGMH can include total 2 bytes.

The SPMH is generated to have a size equal to or smaller than a predetermined size with predetermined periodicity like VoIP. And, the SPMH is a MAC header that supports an application to which ARQ (automatic retransmission request) is not applied.

Table 2 shows one example of a Short-Packet MAC header (SPMH) structure used in a wireless communication system based on IEEE 802.16 system.

TABLE 2

| Syntax | Size(bit) | Notes |
|---|---|---|
| Compact MAC header( ){ | | |
| EH | 1 | Extended header presence indicator; When set to '1', this field indicates that an Extended Header is present following this CMH. |
| Length | 7 | This field indicates the length in bytes of MAC PDU including the CMH and extended header if present. |
| } | | |

Referring to Table 2, a SPMH includes an extended header presence indication field indicating whether a 1-bit extended header is included and a length field indicating a length of MAC PDU including a 7-bit SPMH. And, the SPMH has a header structure in 1-byte size.

The SPMH is used at a resource allocation location, which was already negotiated between a base station and a mobile station, for such resource allocation as persistent resource allocation for allocation a resource to a predetermined location with predetermined periodicity and group resource allocation for allocating a resource to a group including at least one mobile station. The persistent resource allocation or the group resource allocation is used for a packet, which has a size equal to or smaller than a predetermined size, generated with prescribed periodicity like VoIP.

Namely, since the SPMH is used for a small packet generated with prescribed periodicity like VoIP, a receiving side is able to recognize a type of a MAC header included in a corresponding MAC PDU not via an identifier of a flow carrying the corresponding MAC PDU but via corresponding data.

Unlike the generic MAC header, the SPMH does not include a flow identifier field (Flow ID) including a flow identifier bit includes a 7-bit length field different from that of the AGMH.

At least one extended header can be provided ahead of each of the AGMH and the SPMH. In case a corresponding MAC PDU includes a payload, an extended header is inserted in front of the payload.

The extended header is a subheader inserted behind a MAC header in MAC PDU and has the same meaning of an extended subheader. Generally, using an extended header presence indicator field of a MAC header, a receiving side can be informed whether at least one extended header is included in MAC PDU.

Table 3 shows one example of an extended header used in a wireless communication system based on IEEE 802.16 system.

TABLE 3

| Syntax | Size (bit) | Notes |
|---|---|---|
| Extended Header( ){ | | |
| LAST | 1 | Last Extended Header indicator: 0 = one or more extended header flows the current extended header unless specified otherwise; 1 = this extended header is the last exteded header unless specified otherwise |
| Extended Header Type | 4 | Type of extended header (cf. table 4) |
| Extended Heade Body } | Variable | Type dependent content |

Referring to Table 3, an extended header includes a last extended header indicator field (LAST) indicating whether at least one or more other extended headers is present behind the corresponding extended header, an extended header type field (EH Type) indicating a type of the corresponding extended header and an extended header body field (EH Body) including at least one field having information relevant to an extended header indicated by the extended header type field.

When 1 bit is allocated to the last extended header indicator field (LAST) indicating a presence or non-presence of the at least one or more other extended headers, if the corresponding field is set to 0, it indicates that the at least one or more other extended headers are present behind the current extended header. If the corresponding field is set to 1, it is able to indicate that the current extended header is the last present extended header in the corresponding MAC PDU.

In the extended header body field (Body Contents), the included information and a length of the body field are determined according to an extended header type indicated by the extended header type field (Type).

The extended header types are described with reference to Table 4 as follows.

Table 4 shows types of a generic extended header used in a wireless communication system based on IEEE 802.16 system.

TABLE 4

| Extended header type | Notes |
|---|---|
| Fragmentation and Packing Extended Header | This extended header is used in applying fragmentation or packing to MAC PDU accompanied by a payload for a single transport connection. |
| MAC Control Extended Header | This extended header is used when MAC PDU includes a payload for a control connection. |
| Multiplexing Extended Header | This extended header is used when a payload for multiplexing association related to the same SA (security association) multiplexed in the same MAC PDU is included. |
| Message ACK Extended Header | This extended header is used for a base station or a mobile station to indicate acknowledgement of a MAC control message. |
| Sleep Control Extended Header | This extended header is used for a base station or a mobile station to deliver control signaling related to a sleep cycle operation. |
| Correlation Matrix Feedback Extended Header | This extended header is used by a mobile station in response to feedback polling A-MAP IE for requesting a quantized transport correlation matrix when a base station uses 2 or 4 transmitting antennas. |
| MIMO Feedback Extended Header | This extended header is used by a mobile station in response to feedback polling A-MAP IE for requesting a feedback of broadband or subband information. |
| Piggybacked Bandwidth Request Extended Header | This extended header is used when a mobile station requests a piggybacked bandwidth for at least one flow. |

TABLE 4-continued

| Extended header type | Notes |
| --- | --- |
| MAC PDU Length Extended Header | This extended header is added to a corresponding MAC PDU if a MAC PDU length is equal to or greater than 2,047 bytes. |
| ARQ Feedback Extended Header | This extended header is used when an ARQ receiving part transmits feedback information. |

Referring to Table 4, extended header types include Fragmentation & Packing
Extended Header, MAC Control Extended Header, Multiplexing Extended Header, Message ACK Extended Header, Sleep Control Extended Header, Correlation Matrix Feedback Extended Header, MIMO Feedback Extended Header, Piggybacked Bandwidth Request Extended Header, MAC PDU Length Extended Header, ARQ Feedback Extended Header and the like. Theses extended headers are described in Table 4.

Specifically, when a MAC PDU accompanied by a payload for a single transport connection is fragmented or packed or ARQ retransmission is applied, the corresponding MAC PDU is accompanied by the fragmentation & packing extended header (FPEH).

Table 5 shows one example of a fragmentation & packing extended header (FPEH) used in a wireless communication system based on IEEE 802.16 system.

PDU, a fragmentation control field (FC) including control information related to fragmentation, an ARQ feedback information element presence indication field (AFI) and an ARQ feedback poll presence indication field (AFP).

In this case, if the rearrangement information indicator field (RI) indicates that rearrangement information is further included (RI=1), the FPEH selectively includes the last ARQ subblock indicator (LSI) indicating whether a last ARQ subblock is included and the field (SSN) indicating a sub-sequence number of a first ARQ subblock.

Moreover, the FPEH includes an additional information indication field (End) indicating whether additional information transmitted via an extended header further exists. And, the FPEH can selectively include the length field (Length) indicating length information of a SDU or an SDU fragment.

The sequence number field (SN) indicates a sequence number of a MAC PDU accompanied by a payload and is incremented for each MAC PDU by 1. If the FPEH is used for an

TABLE 5

| Syntax | Size (bit) | Notes |
| --- | --- | --- |
| FPEH( ){ | | |
| RI | 1 | ARQ rearrangement indicator: '0' bit setting Not indicate ARQ rearrangement '1' bit setting Indicate ARQ rearrangement |
| SN(Sequence Number) | 10 | SN is maintained per connection.-For non-ARQ connection, SN represents the MAC PDU payload Sequence Number and the SN value increments by one for each MAC PDU.-For ARQ connection, SN represents the ARQ block sequence number. |
| FC | 2 | Control information on packet segmentation |
| AFI | 1 | ARQ feedback information element (IE) indicator-'0' bit setting: ARQ feedback IE is not included in MAC PDU-'1' bit setting: ARQ feedback IE is present behind FPEH |
| AFP | 1 | ARQ feedback poll indicator-'0' bit setting: ARQ feedback poll is not included-'1' bit setting: ARQ feedback poll relevant to a connection indicated by a generic MAC header (GMH) is included |
| If(RI=1){ | | |
| LSI | 1 | Last ARQ subblock indicator-'0' bit setting: Last subblock in single ARQ block not included in a corresponding MAC PDU is indicated-'1' bit setting: Single ARQ block included in a corresponding MAC PDU |
| SSN } | TBD | Sub-sequence number of $1^{st}$ ARQ subblock |
| Do{ | | |
| End | 1 | This field indicates whether other information is included.-'0' bit setting: 'Length' field and other 'End' field are further included-'1' bit setting: 'Length' field and other 'End' field are not further included |
| If(End=0){ | | |
| Length } | 11 | Length information of SDU or segmented SDU |
| }while(!End) | | |
| Reserved } | variable | } |

Referring to Table 5, a FPEH includes a rearrangement information indicator field (RI) indicating whether ARQ rearrangement information is included, a sequence number field (SN) indicating a sequence number of a corresponding MAC ARQ connection, the sequence number field is set to a value that indicated a sequence number of an ARQ block.

Even if fragmentation, packing or the like is not applied to MAC PDU, in order to include information on a sequence number for HARQ reordering of a packet, every MAC PDU including a generic MAC header or a SPMH can be accompanied by a FPEH. Therefore, compared to the basic extended header structure shown in Table 3, the FPEH may not include a last extended header indication field (Last) indicating whether at least one or more other extended headers are present behind the corresponding extended header and an extended header type field (Type) indicating a type of the corresponding extended header.

In Table 5, if the rearrangement header identifier field (RI) is set to 0 and the additional information indication field (End) indicating whether more information is included is set to 0, the FPEH has a length of at least 2 bytes.

In particular, even if the SPMH described with reference to Table 2 is used to transmit such a packet as VoIP, a corresponding MAC PDU is accompanied by a FPEH of minimum 2 bytes to include information on a sequence number without using fragmentation, packing or ARQ. And, 3-byte MAC header overhead is generated.

Therefore, the present invention proposes a structure of an extended SPMH containing sequence number information in order to prepare for a case of using a FPEH for containing sequence number information only. In case that VoIP packet is transmitted using a SPMH according to one embodiment of the present invention, a separate FPEH may not be added.

Moreover, in order to transmit such data as VoIP, a transmission scheme can be varied according to a channel configuration of users of a SPMH according to one embodiment of the present invention. In case that a channel configuration is poor (e.g., users are located on a cell edge or a cell boundary area, it is able to use a partition transmission scheme for data generated in a predetermined size or smaller with prescribed periodicity like VoIP. In this case, the present invention intends to propose a method of reducing a header overhead by generating a FPEH contained in transmission data into a simplified structure containing necessary information only.

Table 6 shows another example of a SPMH structure according to one embodiment of the present invention.

TABLE 6

| Syntax | Size (bit) | Notes |
|---|---|---|
| Compact MAC Header( ){ | | |
| Flow ID | 4 | Flow Identifer |
| EH | 1 | Extended Header presence indicator |
| Length | 7 | This field indicates the length in bytes of MAC PDU |
| Sequence Number(SN) } | 4 | MAC PDU payload sequence number increment by one for each MAC PDU |

Referring to Table 6, a SPMH according to one embodiment of the present invention includes a flow identifier field (FID) including an identifier of a service flow, an extended header presence indicator field (EH) indicating whether at least one extended header is present behind the SPMH, a length field (Length) including length information of a corresponding MAC PDU including the SPMH, and a sequence number field (SN) including a sequence number. In the following description, in order to discriminate a SPMH according to one embodiment of the present invention from the generally user SPMH described with reference to Table 2, the SPMH having the structure exemplarily shown in Table 2 shall be named 'extended SPMH'. In particular, the extended SPMH is a SPMH including a flow identifier field and a sequence number field and can have the same meaning of a SPMH in use.

In Table 6, when a single mobile station uses a SPMH for several service flows, a flow identifier field (Flow ID) indicates an inter-flow discrimination or identification. And, a sequence number field (SN) includes information on a sequence number of a corresponding MAC PDU.

When such a small packet generated in predetermined size or smaller with prescribed periodicity as VoIP is transmitted, a SPMH indicates a sequence number of MAC PDU. In case that an error check is necessary for such a packet as VoIP without applying fragmentation, packing and/or ARQ retransmission thereto, HARQ reordering is applied. Hence, a FPEH just uses a sequence number field indicating a sequence number of a corresponding MAC PDU.

Moreover, since ARQ is not applied to such a packet as VoIP, the sequence number field off the SPMH just includes a sequence number of a MAC PDU, to which ARQ will not be applied, unlike a sequence number field indicating a sequence number of a non-ARQ/ARQ applied MAC PDU included in a FPEH.

Therefore, the sequence number field of the SPMH can indicate a necessary sequence number using 4 bits only unlike a 10-bit sequence number field of the FPEH.

Figure 6:
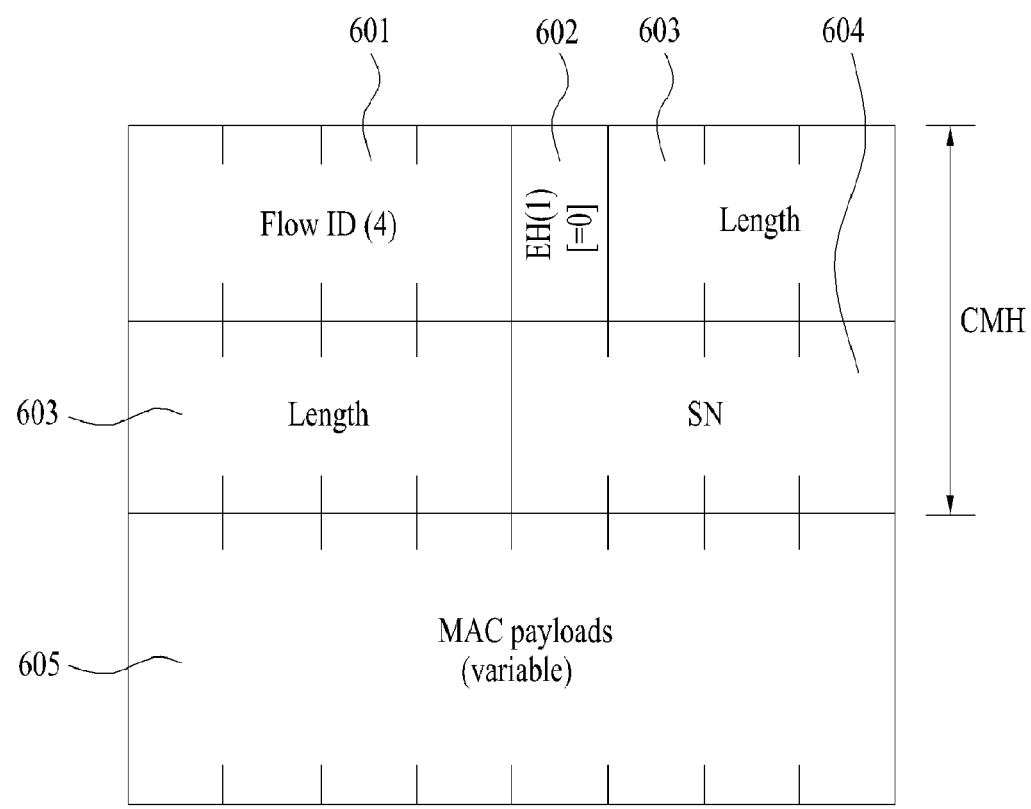
FIG. 6 is a diagram for one example of MAC PDU using an extended compression MAC header structure according to one embodiment of the present invention.

FIG. 6 is a diagram for one example of MAC PDU using an extended compression MAC header structure according to one embodiment of the present invention. In the following disclosure including FIG. 6, a single scale mark of a block representing a MAC PDU structure indicates 1 bit and a horizontal row indicates 1 byte. Moreover, bits are arranged downward in order from a most significant bit (MSB) to a least significant bit.

Referring to FIG. 6, in case that fragmentation is not applied to a payload of MAC PDU, it is able to construct MAC PDU using the extended SPMH exemplarily shown in Table 6. In this case, the extended SPMH includes a flow identifier field (Flow ID) 601 having an identifier of a service flow, an extended header presence indicator field (EH) 602 indicating a presence or non-presence of an extended header, a length field (Length) 603 having length information of a MAC PDU, and a sequence number field (SN) 604 indicating a sequence number of the corresponding MAC PDU.

In case of using the above configured extended compact MAC header, a separate FPEH needs not to be present to apply fragmentation to the corresponding MAC PDU. Hence, a bit set at the extended header presence indicator field (EH) 602 included in the SPMH can be set to 0 to indicate that an extended header is not present at the corresponding MAC PDU.

In this case, since the extended SPMH includes the 4-bit flow identifier field 601, the 1-bit extended header presence indicator field 602, the length field 603 and the sequence number field 604, as shown in FIG. 6, a size of the extended SPMH can have total 2 bytes. In this case, an overhead of the MAC header can become minimum 2 bytes.

As mentioned in the foregoing description, when such a packet as VoIP, to which HARQ reordering is generally applied in performing an error check instead of applying fragmentation or packing, is transmitted, an extended SPMH is used. Therefore, a separate FPEH needs not to be present.

When a user is located at a cell edge, a channel configuration is poor. In this case, it is able to use a method of transmitting such a packet as VoIP by applying fragmentation or packing. Yet, if the FPEH shown in Table 5 is further added to apply the fragmentation or packing to MAC PDU including an extended SPMH, a MAC header overhead increases.

Therefore, the present invention intends to provide an efficient FPEH structure usable in applying fragmentation to MAC PDU that uses the above described SPMH. In particular, the present invention intends to provide one FPEH structure using a general extended header structure and another FPEH structure using a new extended header structure.

1. FPEH Including Last Field

Referring to Table 3, an extended header used by IEEE 802.16 system generally includes a last extended header presence indication field (Last) indicating whether at least one extended header is present behind the corresponding extended header, an extended header type field (Type) indicating a type of the corresponding extended header, and a body field (Body Contents) constructed with at least one field containing informations relevant to the extended header indicated by the extended header type field.

A FPEH according to one embodiment of the present invention is able to use a basic extended header structure.

Table 7 shows one example of a FPEH structure according to one embodiment of the present invention.

TABLE 7

| Syntax | Size (bit) | Notes |
| --- | --- | --- |
| FPEH( ){ | — | |
| Last | 1 | Last Extended Header Indication(This field indicates whether a corresponding extended header is a last extended header included in a corresponding MAC PDU.) |
| Type | 4 | fragmentation & packing extended header |
| FC | 2 | control information on packet segmentation |
| SN Indicator | 1 | This field indicates whether SN field is added.-'0' bit setting: No added SN field-'1' bit setting: Added SN field present |
| If (SN Indicator==1){ | | |
| SN | 8 | |
| } | | |
| Do{ | | |
| End | 1 | This field indicates whether other information is further included.-'0' bit setting: This indicates 'Length' field and another 'End']field are further included.-'1' bit setting: This indicates 'Length' field and another 'End' field are not further included. |
| If(End=0){ | | |
| Length | 11 | length information of SDU or segmented |
| } | | |
| }while(!End) | | |
| Padding | variable | bits included for byte alignment |
| } | | |

Referring to Table 7, a FPEH according to one embodiment of the present invention includes a last extended header presence indication field (Last) indicating whether the FPEH is a last extended header present in a corresponding MAC PDU, an extended header type field (type) indicating a type of a corresponding extended header, a fragmentation control field (FC) including fragmentation control bit, and a sequence number presence indicator field (SN indicator) indicating a presence or non-presence of a sequence number field.

When the MAC PDU including the extended SPMH described with reference to Table 6 is fragmented and transmitted, in order for a receiving side to check fragmentation control information via a fragmentation control information field (FC), the FPEH according to one embodiment of the present invention includes an extended header type field (Type) indicating that the corresponding extended header is a FPEH. In particular, the extended header type field is set to a bit to indicate that the corresponding extended header is the FPEH.

The fragmentation control information field is described with reference to Table 8 as follows.

Table 8 is provided to describe fragmentation control information indicated via a fragmentation control field (FC) included in a FPEH. And, each fragmentation control information is described in Table 8.

TABLE 8

| FC | Meaning | Examples |
| --- | --- | --- |
| 00 | First and last bytes included in MAC PDU payload correspond to first and last bytes of MAC PDU. | One or multiple non-segmented SDU packed in one MAC PDU |
| 01 | First byte of data included in MAC PDU payload corresponds to first byte of MAC SDU. Last byte of MAC PAD does not correspond to last byte of MAC SDU. | MAC PDU including last data among segmented data of one SDU-MAC PDU including last segmented data of one SDU contiguous to first segmented data among segmented data of contiguous SDUs |
| 10 | First byte of data included in MAC PDU payload does not correspond to first byte of MAC SDU. Last byte of MAC PAD corresponds to last byte of MAC SDU. | MAC PDU including only segmented data of middle part among segmented data of one SDU-MAC PDU including last segmented data among segmented data of one SDU contiguous to at least one non-segmented contiguous SDUs |
| 11 | First byte of data included in MAC PDU payload does not correspond to first byte of MAC SDU. Last byte of MAC PAD does not correspond to last byte of MAC SDU. | MAC PDU including middle data only among segmented data of one SDU-MAC PDU including last segmented data among segmented data of one SDU contiguous to first segmented data among segmented data of contiguous SDU or 0 or at least one non-segmented SDU |

Referring now to Table 8, the field (SN indicator) indicating whether a sequence number field is added is provided to indicate whether a sequence number field added to a FPEH exists in case of using an extended SPMH. When 1 bit is allocated to the corresponding field, if the corresponding field is set to 0, it indicates that there is no added sequence number field. If the corresponding field is set to 1, it indicates that the sequence number field is added to the FPEH.

In case that MAC PDU is constructed in a manner of including an extended SPMH to transmit such a packet as VoIP, even if HARQ retransmission is applied to the packet such as VoIP, it is able to indicate a sequence number of the corresponding MAC PDU via a sequence number field of the extended SPMH. Hence, the sequence number field addition indicator field can be set to 0.

Yet, the meaning indicated according to the bit setting at the corresponding field is just one example for describing the present invention. And, the meanings indicated by the '0' and '1' bit settings can be switched to each other.

In case of using a SPMH or an extended SPMH, the rearrangement information indicator field (RI), the ARQ feedback IE indicator field (AFI), the ARQ feedback poll indicator field (AFP), the length field (Length) and the like in Table 5 among the fields configuring the FPEH are not necessary. Therefore, in case of using a SPMH or an extended SPMH, it is able to use a FPEH constructed with a last extended header indicator field (Last), an extended header type field (Type) and a fragmentation control information field (FC) only by setting the sequence number field addition indicator field to 0.

Thus, it is able to configure a FPEH according to one embodiment of the present invention.

Figure 7:
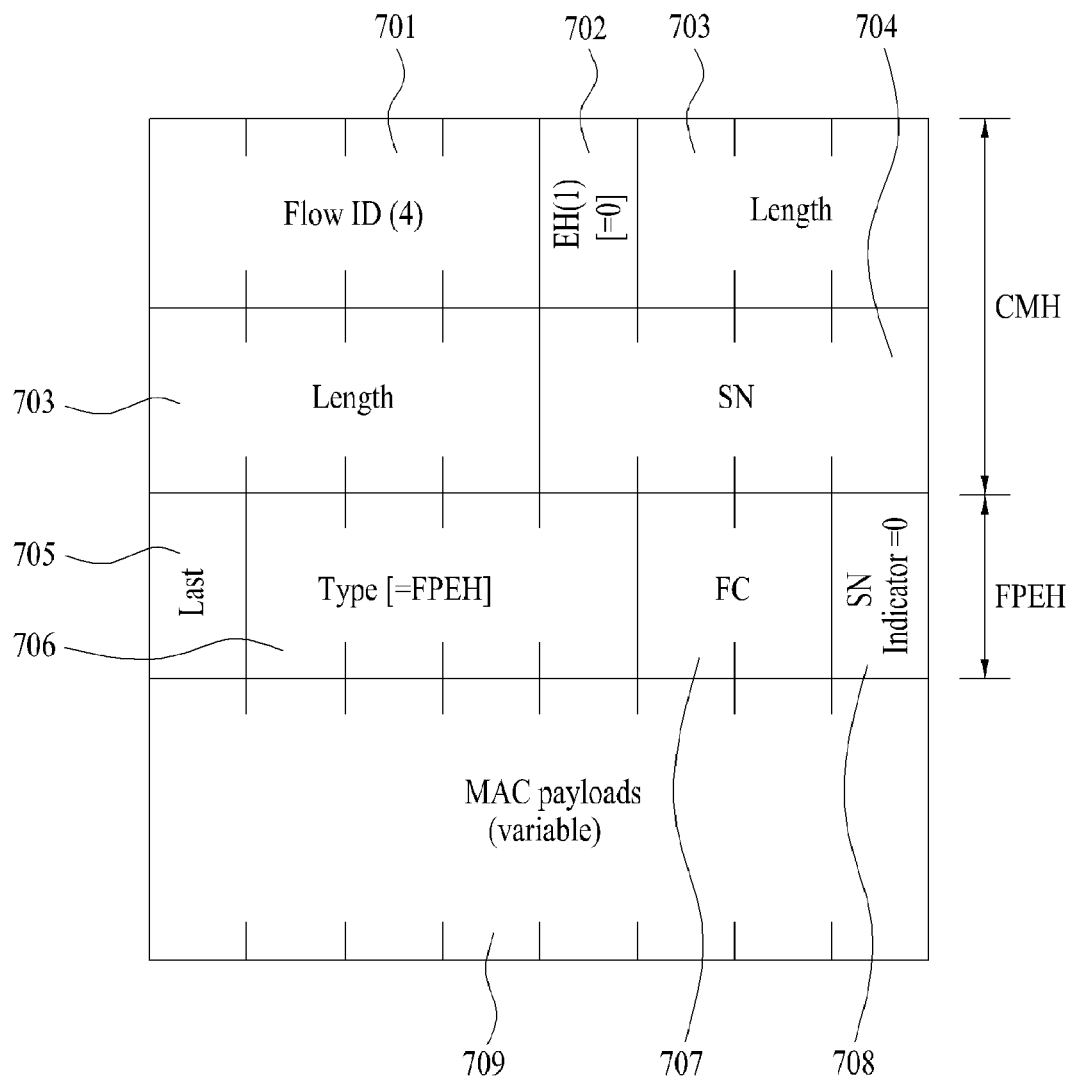
FIG. 7 is a diagram for one example of MAC PDU with a fragmentation & packing extended header according to one embodiment of the present invention.

FIG. 7 is a diagram for one example of MAC PDU with a FPEH according to one embodiment of the present invention.

In particular, FIG. 7 shows a MAC PDU structure to which a FPEH is added to apply fragmentation to a packet including an extended SPMH.

Referring to FIG. 7, MAC PDU can include the extended SPMH described with reference to FIG. 6, the FPEH according to one embodiment of the present invention described with reference to Table 8, and a MAC payload field 709.

The extended SPMH includes a flow identifier field (Flow ID) 701, an extended header presence indicator field (EH) 702, a length field (Length) 703 indicating length information of a corresponding MAC PDU, and a sequence number field (SN) 704. And, these fields correspond to the former fields 601 to 604 shown in FIG. 6, respectively. For clarity of this disclosure, the same descriptions of the fields are omitted from the following description.

Since the corresponding MAC PDU is accompanied by the FPEH, the extended header presence indicator field 702 is set to 1 according to the above mentioned embodiment.

The FPEH can include at least one or more fields related to fragmentation only. For instance, the FPEH, as shown in FIG. 7, can just include a 1-bit last extended header indicator field (Last) 705 indicating whether a corresponding extended header is an extended header last present at the corresponding MAC PDU, a 4-bit extended header type field (Type) 706, a 2-bit fragmentation control information field (FC) 707, and a 1-bit sequence number field presence indicator field (SN Indicator) 708. In this case, by setting a sequence number field presence indicator (SN Indicator) to 0, it is able to exclude fields having nothing to do with a case of using a SPMH. In this case, a size of the FPEH is implemented with 1 byte and a header overhead in MAC PDU using a 2-byte extended SPMH becomes 3 bytes.

Table 9 shows another example of a FPEH structure according to one embodiment of the present invention.

TABLE 9

| Syntax | Size (bit) | Notes |
| --- | --- | --- |
| FPEH( ){ | — | |
| Last | 1 | |
| Type | 4 | Fragmentation & packing extended header |
| FC | 2 | Control information on packet segmentation |
| OFI | 1 | Optional field presence indicator (This field is an indicator indicating whether fields used by FPEH in using a general MAC header. This field indicates whether additional SN field is included.)-'0' bit setting: Optional field not included-'1' bit setting: Optional field included |
| If (OFI==1){ | | |
| SN | 8 | |
| AFP | 1 | ARQ feedback poll presence indicator |
| RI | 1 | Rearrangement information presence indicator-'0' bit setting: no-ARQ rearrangement-'1' bit setting: ARQ rearrangement |
| Do{ | | |
| End | 1 | Other information presence indicator-'0' bit setting: Indicates whether 'Length' field and another 'End' field are further included-'1' bit setting: Indicates 'Length' field and another 'End' field are not further included |
| If(End=0){ | | |
| Length | 11 | Length information of SDU or segmented SDU |
| } | | |
| }while(!End) | | |
| } | | |
| Padding | variable | Bits for byte alignment |
| } | | |

Referring to Table 9, a FPEH according to another embodiment of the present invention includes a last extended header presence indicator field (Last) indicating whether the FPEH is a last present extended header, an extended header type field indicating a type of a corresponding extended header, a fragmentation control field (FC) including fragmentation control bit, and an optional field indicator field (OFI) indicating a presence or non-presence of an optional field. Likewise, it is able to provide information indicating that the FPEH is included in a corresponding MAC PDU to a receiving side via the extended header type field.

For clarity, the description of the fields shown in Table 9 is omitted from the following description if the corresponding fields shown in Table 9 are identical to those shown in Table 5.

Referring to Table 9, a sequence number field (SN) necessary in using a general MAC header, a field (Length) including length information of MAC PDU necessary for packing, a field (RI) including a rearrangement information indicator, a field (AFI) including an ARQ feedback IE indicator, a field (AFP) including an ARQ feedback poll indicator or the like is not used by a SPMH and can be classified into an optional field.

Therefore, in a manner of adding a field (OFI) including an indicator indicating whether optional fields are included, it is able to configure a FPEH by excluding corresponding fields from a SPMH. When 1 bit is allocated to a field (OFI) including an indicator indicating whether an optional field is included, if the corresponding field is set to 0, it indicates that the optional field is not included. If the corresponding field is set to 1, it indicates that the optional field is included. Yet, the meaning indicated according to the bit setting at the corresponding field is just one example for describing the present invention. And, the meanings indicated by the '0' and '1' bit settings can be switched to each other.

When a SPMH or an extended SPMH is used, it is able to use a FPEH constructed just with a last extended header indicator field (Last), an extended header type field (Type) and a fragmentation control information field (FC) by setting an optional field indicator to 0.

Figure 8:
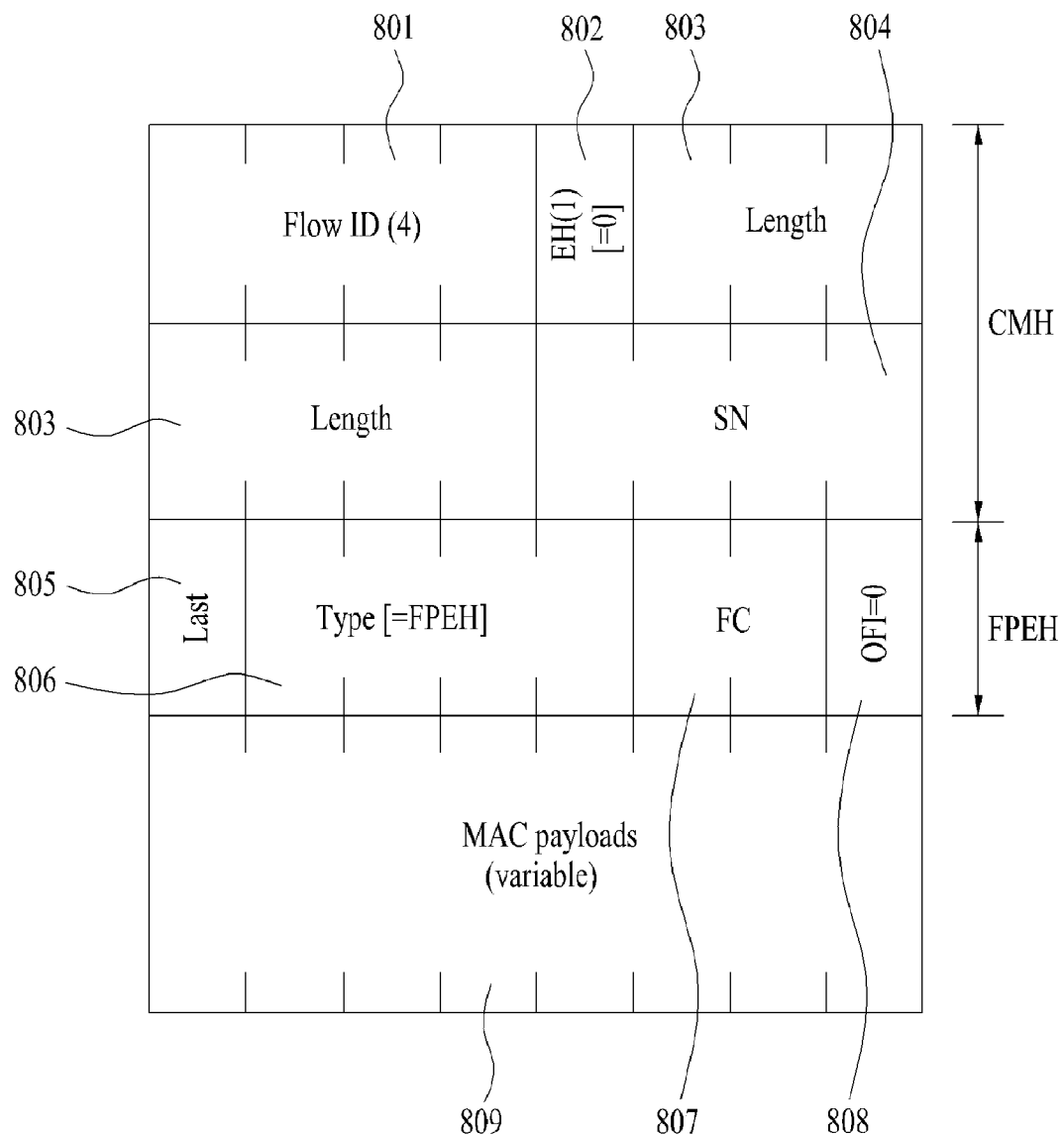
FIG. 8 is a diagram for another example of MAC PDU with a fragmentation & packing extended header according to another embodiment of the present invention.

FIG. 8 is a diagram for another example of MAC PDU with a FPEH according to another embodiment of the present invention. In particular, FIG. 8 shows a MAC PDU structure to which a FPEH is added to apply fragmentation to a packet including an extended SPMH.

Referring to FIG. 8, MAC PDU can include the extended SPMH described with reference to FIG. 6, the FPEH according to another embodiment of the present invention described with reference to Table 9, and a MAC payload field 809. In this case, the fields 801 to 804 constructing the extended SPMH correspond to the former fields 601 to 604 shown in FIG. 6, respectively. For clarity of this disclosure, the same descriptions of the fields are omitted from the following description.

The FPEH can include at least one or more fields related to fragmentation only. For instance, the FPEH, as shown in FIG. 8, can include a 1-bit last extended header indicator field (Last) 805 indicating whether a corresponding extended header is an extended header last present at the corresponding MAC PDU, a 4-bit extended header type field (Type) 806, a 2-bit fragmentation control information field (FC) 807, and a 1-bit optional field indicator field (OFI) 808 indicating an optional field indicator.

In this case, if the optional field indicator field (OFI) 806 is set to 0 according to the above mentioned embodiment, since the FPEH is not accompanied by a plurality of fields corresponding to the optional fields, it can be implemented with a 1-byte size. Hence, a header overhead including an extended header in MAC PDU, which uses a 1-byte extended SPMH, becomes 3 bytes.

Table 10 shows another example of a FPEH structure according to one embodiment of the present invention.

TABLE 10

| Syntax | Size (bit) | Notes |
|---|---|---|
| FPEH( ){ | — | |
| Last | 1 | |
| Type | 4 | Fragmentation & packing extended header |
| FC | 2 | Control information on packet segmentation |
| If (MAC header == AGMH) | | |
| SN | 8 | |
| AFP | 1 | ARQ feedback poll presence indicator |
| RI | 1 | Rearrangement information presence indicator |
| Do{ | | |
| End | 1 | Other information presence indicator- '0' bit setting: Indicates whether 'Length' field and another 'End' field are further included-'1' bit setting: Indicates 'Length' field and another 'End' field are not further included |
| If(End=0){ | | |
| Length | 11 | Length information of SDU or segmented SDU |
| } | | |
| }while(!End) | | |
| } | | |
| Padding | variable | Bits for byte alignment |
| } | | |

A FPEH according to a further embodiment of the present invention exemplarily shown in Table 10 is able to provide information indicating that the FPEH is included in a corresponding MAC PDU to a receiving side via the extended header type field. For clarity, the description of the fields shown in Table 10 is omitted from the following description if the corresponding fields shown in Table 10 are identical to those shown in Table 5.

Referring to Table 10, a sequence number field (SN) necessary in using a general MAC header, a length field (Length) including length information of MAC PDU necessary for packing, a rearrangement information indicator field (RI) including a rearrangement information indicator, an ARQ feedback IE indicator field (AFI), an ARQ feedback poll indicator field (AFP) or the like is not used by a SPMH. And, this field can be configured to be included in a FPEH only if a general MAC header is used.

In particular, in case of using a SPMH, a FPEH can include a last extended header indicator field (Last), an extended header type field (Type) and a fragmentation control information field (FC) only.

Figure 9:
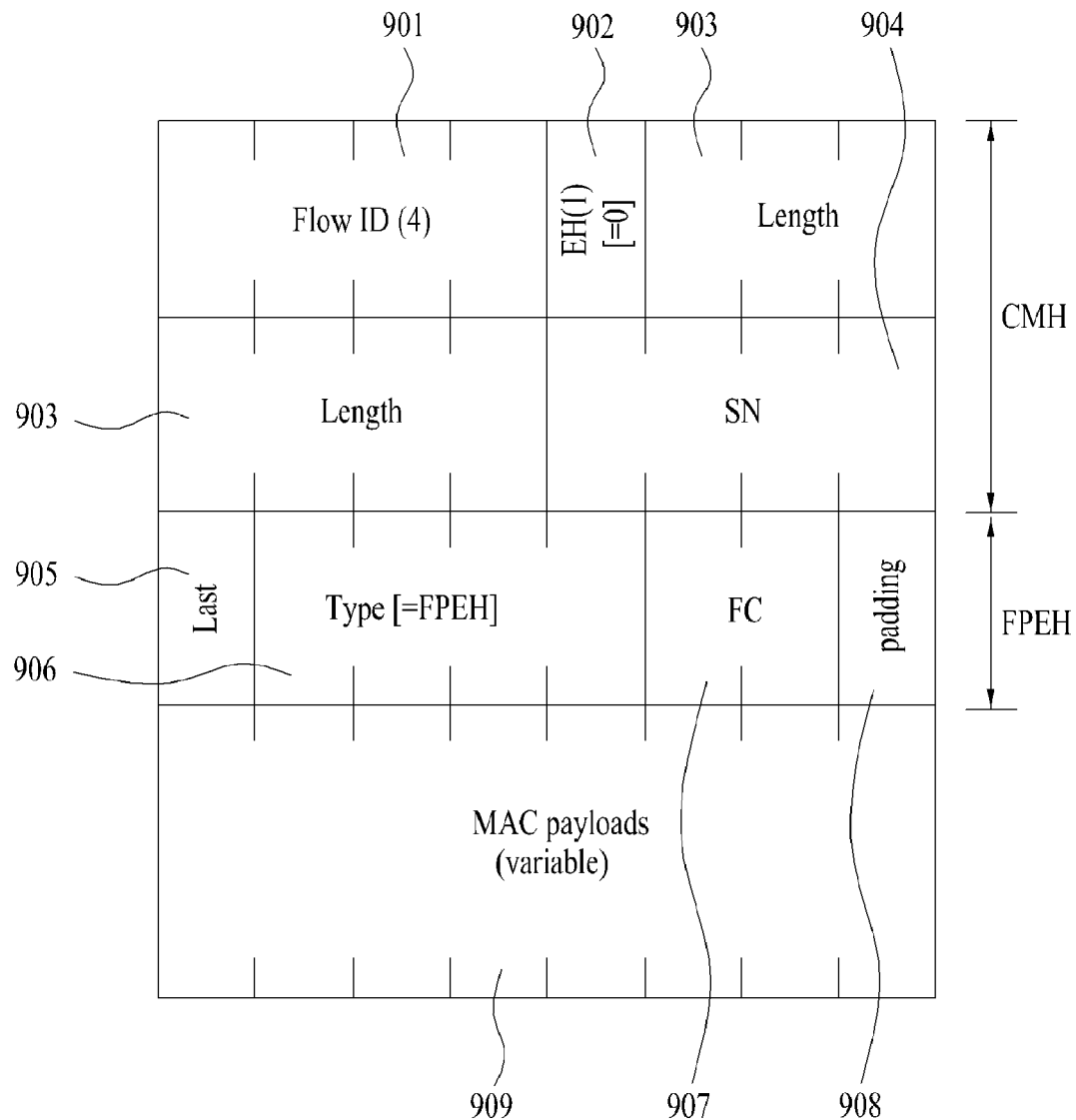
FIG. 9 is a diagram for a further example of MAC PDU with a fragmentation & packing extended header according to a further embodiment of the present invention.

FIG. 9 is a diagram for a further example of MAC PDU with a FPEH according to a further embodiment of the present invention. In particular, FIG. 9 shows a MAC PDU structure to which a FPEH is added to apply fragmentation to a packet including an extended SPMH.

Referring to FIG. 9, MAC PDU can include the extended SPMH described with reference to FIG. 6, the FPEH according to another embodiment of the present invention described with reference to Table 9, and a MAC payload field 909. In this case, the fields 901 to 904 constructing the extended SPMH correspond to the former fields 601 to 604 shown in FIG. 6, respectively. For clarity of this disclosure, the same descriptions of the fields are omitted from the following description.

The FPEH, as shown in FIG. 9, can include at least one or more fields related to fragmentation only. For instance, the FPEH can include a 1-bit last extended header indicator field (Last) 905 indicating whether a corresponding extended header is an extended header last present at the corresponding MAC PDU, a 4-bit extended header type field (Type) 906 and a 2-bit fragmentation control information field (FC) 907 only. And, a padding field 908 is a region to which a bit is added to construct the FPEH with 1 byte. According to the embodiment shown in FIG. 9, a 1-bit padding field 908 can be included for byte arrangement.

Hence, a MAC header overhead becomes 3 bytes because a MAC PDU, which uses a 2-byte extended SPMH, is accompanied by a 1-byte FPEH.

2. FPEH not including Last field.

The FPEH according to the above-described embodiments of the present invention has a structure including a field (Last) that contains information indicating whether another extended header is further present.

According to another embodiment of the present invention, it is able to separately configure a field relevant to an extended header group including at least one extended header present at MAC PDU. This is explained with reference to FIG. 10 and Table 11 as follows.

Figure 10:
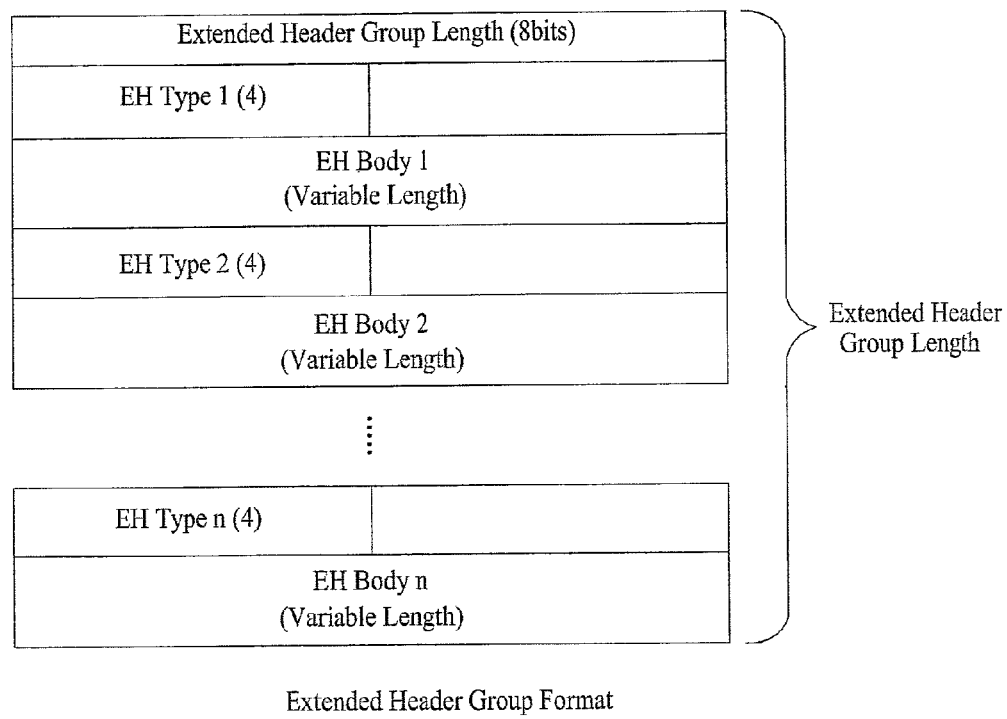
FIG. 10 is a diagram for one example of an extended header group structure according to one embodiment of the present invention.

FIG. 10 is a diagram for one example of an extended header group structure according to one embodiment of the present invention.

Referring to FIG. 10, an extended header group can include an extended header group length field (Extended Header Group Length) including total length information of an included extended header group, an extended header type field (Extended header Type) indicating an extended header type of each of at least one or more accompanying extended headers, and each extended header body field (Extended header Body).

Table 11 shows each field constructing an extended header group according to one embodiment of the present invention.

TABLE 11

| Syntax | Size (bit) | Notes |
|---|---|---|
| Extended Header Group Length | 8 | This field includes information on total length of an extended header group constructed with at least one extended header present at corresponding MAC PDU. Length information is represented by byte unit. |
| Extended header Type | 4 | Type of extended header (cf. Table 4) |
| Extended header Body | Variable | Contents according to extended header type |

Referring to Table 11, an extended header group does not include a last extended header presence indicator field (Last) indicating whether a next extended header is further included in each extended header. Instead, by delivering length information of total extended headers present at a corresponding MAC PDU via an extended header group length field, it is able to derive whether an ith extended header read by a receiving side from the corresponding MAC PDU is a last extended header via the MAC PDU including total length information of the extended header group.

A presence or non-presence of inclusion of the extended header group can be represented in the same manner via an extended header presence indicator field (EH) indicating whether an extended header is included. A length field of the extended header group is inserted behind a MAC header used in the MAC PDU. And, at least one or more accompanying extended headers are inserted in order.

Table 12 is provided to describe another example of a FPEH structure according to one embodiment of the present invention. In particular, Table 12 is provided to describe a FPEH structure in case of using an AGMH.

TABLE 12

| Syntax | Size (bit) | Notes |
|---|---|---|
| FPEH( ){ | — | |
| Type | 4 | Fragmentation & packing extended header |
| FC | 2 | Control information on packet segmentation |
| If (MAC header == AGMH) | | |
| SN | 8 | |
| AFP | 1 | ARQ feedback poll presence indicator |
| RI | 1 | Rearrangement information presence indicator |
| If (RI ==1){ | | |
| LSI | | Last ARQ subblock presence indicator |
| SSN | | Sub-sequence number of 1$^{st}$ ARQ subblock |
| } | | |
| Do{ | | |
| End | 1 | Other information presence indicator-'0' bit setting: Indicates whether 'Length' field and another 'End' field are further included-'1' bit setting: Indicates 'Length' field and another 'End' field are not further included |
| If(End=0){ | | |
| Length | 11 | Length information of SDU or segmented SDU |
| } | | |
| }while(!End) | | |
| } | | |
| Padding | variable | Bits for byte alignment |
| } | | |

Referring to Table 12, a FPEH according to a further embodiment of the present invention does not include a last extended header presence indicator field (Last) indicating whether another extended header is present behind a corresponding extended header. For clarity, the description of the fields shown in Table 12 is omitted from the following description if the corresponding fields shown in Table 12 are identical to those shown in Table 5.

Referring to Table 12, in case of using a SPMH, it is able to use a FPEH including an extended header type field and a fragmentation control information field only. This is explained with reference to one example shown in Table 13.

Table 13 is provided to describe another example of a FPEH structure according to one embodiment of the present invention. In particular, Table 13 shows a simplified FPEH in case of using a SPMH in Table 12.

TABLE 13

| Syntax | Size (bit) | Notes |
|---|---|---|
| FPEH( ){ | — | |
| Type | 4 | Fragmentation & packing extended header |
| FC | 2 | Control information on packet segmentation |
| Padding | variable | Bits for byte alignment |
| } | | |

Referring to Table 13, in case of using an extended SPMH including a sequence number field, a FPEH can be configured to include an extended header type field and a fragmentation control information field only. In particular, fields related to a generic MAC header (e.g., SN field, AFT field, RI field, End field, Length field and the like) can be excluded. A structure of MAC PDU accompanied by the above-configured FPEH shall be explained with reference to FIG. 11 as follows.

Figure 11:
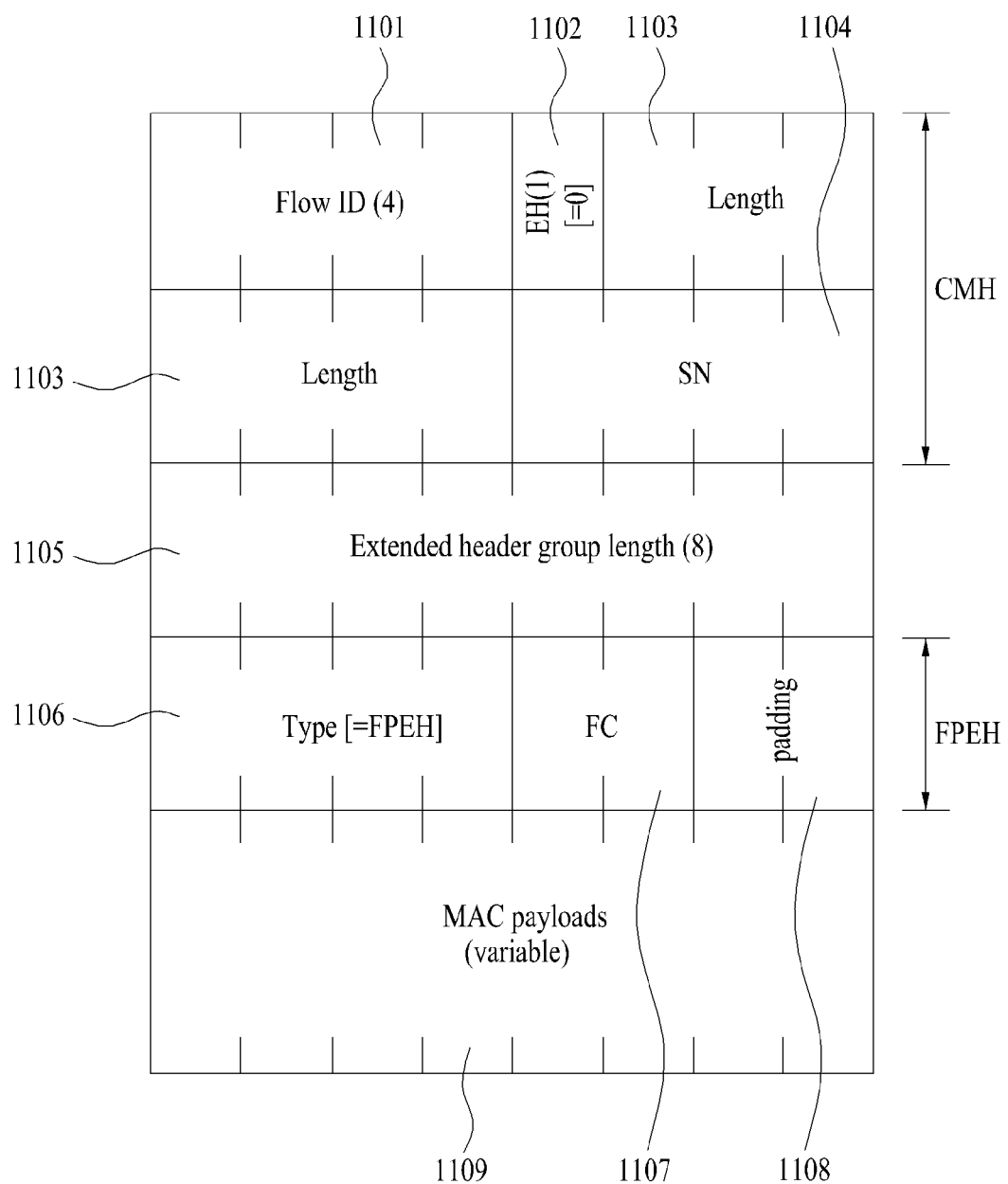
FIG. 11 is a diagram for another further example of MAC PDU with a fragmentation & packing extended header according to another further embodiment of the present invention.

FIG. 11 is a diagram for another further example of MAC PDU with a FPEH according to another further embodiment of the present invention. In particular, when a packet is transmitted using a SPMH, FIG. 11 shows a MAC PDU structure in case of applying fragmentation to the corresponding packet.

Referring to FIG. 11, MAC PDU can include the extended SPMHs 1101 to 1104 described with reference to Table 6, a field 1105 including length information of the extended header group described with reference to Table 11, the FPEHs 1106 to 1108 according to another embodiment of the present invention described with reference to Table 12, and a MAC payload field 1109. In this case, the fields 1101 to 1104 constructing the extended SPMH correspond to the former fields 601 to 604 shown in FIG. 6, respectively. For clarity of this disclosure, the same descriptions of the fields are omitted from the following description.

The FPEH, as shown in FIG. 11, can include a 4-bit extended header type field (Type) 1106 and a 2-bit fragmentation control information field (FC) 1107. And, a padding field 1108 is a region to which bits are added to construct the FPEH with 1 byte. According to the embodiment shown in FIG. 11, padding with 2 bits is performed for byte arrangement.

Hence, a size of a FPEH according to another further embodiment of the present invention becomes 1 byte. In case that a 2-byte extended SPMH and a 1-byte extended header group length field are included in the corresponding MAC PDU, a MAC header overhead can become 4 bytes.

In the above-described embodiments of the present invention, a FPEH is taken as an example for an extended header added in case of segmenting and transmitting a packet.

Yet, in case that a FPEH is divided into a fragmentation extended header (FEH) and a packing extended header (PEH), the above-described embodiments are applicable to the fragmentation extended header or the packing extended header in the same manner.

The FEH will be included in the MAC PDU with SPME/AGMH if the transport connection payload in the MAC PDU contains a fragment of MAC SDU. The FEH will be included in the MAC PDU with AGMH if the transport connection payload in the MAC PDU contains an unfragmented MAC SDU which requires a sequence number.

The PEH will be included in the MAC PDU with AGMH if the MAC PDUs or MAC SDUs fragment of both are packed in the transport connection in the MAC PDU.

This is schematically explained with reference to Tables 14 to 17 as follows.

Table 14 shows one example of a fragmentation extended header (FEH) according to one embodiment of the present invention.

TABLE 14

| Syntax | Size (bits) | Notes |
|---|---|---|
| FEH ( ){ | | |
| Type | 4 | Fragmentation extended header type |
| FC | 2 | Fragmentation control information |
| If (MAC Header == AGMH) { | | |

TABLE 14-continued

| Syntax | Size (bits) | Notes |
|---|---|---|
| SN | 10 | SN is maintained per connection.-For non-ARQ connection, 'SN' represents the MAC PDU payload Sequence Number and the 'SN' value increments by one for each MAC PDU.-For ARQ connection, 'SN' represents the ARQ block sequence number. |
| }<br>Else {<br>Reserved<br>}<br>} | 2 | |

Referring to Table 14, in case that a SPMH is included in a corresponding MAC PDU, a fragmentation extended header according to one embodiment of the present invention includes an extended header type field and a fragmentation control information field including information of packet segmentation.

On the contrary, in case that an AGMH is included in a corresponding MAC PDU, a fragmentation extended header according to one embodiment of the present invention is able to further include a sequence number field including a sequence number of the corresponding MAC PDU.

Table 15 shows another example of a fragmentation extended header (FEH) according to one embodiment of the present invention.

TABLE 15

| Syntax | Size (bits) | Notes |
|---|---|---|
| FEH ( ){<br>Type | 4 | Fragmentation extended header type |
| FC | 2 | Fragmentation control information |
| SN Indicator | 1 | This field indicates whether SN field is added.-'0' bit setting: presence of added SN field-'1' bit setting: presence of added SN field |
| If (SN Indicator==1){<br>SN | 10 | SN is maintained per connection.-For non-ARQ connection, 'SN' represents the MAC PDU payload Sequence Number and the 'SN' value increments by one for each MAC PDU.-For ARQ connection, 'SN' represents the ARQ block sequence number. |
| }<br>Else {<br>Reserved<br>}<br>} | 2 | |

Referring to Table 15, a fragmentation extended header according to another embodiment of the present invention includes an extended header type field, a fragmentation control information field including information on packet segmentation, and a sequence number indicator field indicating whether an additional sequence number is included.

In case that a SPMH is included in a corresponding MAC PDU, the fragmentation extended header according to another embodiment of the present invention is able to include the above-mentioned fields only.

On the contrary, in case that an AGMH is included in a corresponding MAC PDU, a fragmentation extended header according to another embodiment of the present invention is able to further include a sequence number field including a sequence number of the corresponding MAC PDU.

Table 16 shows one example of a packing extended header (PEH) according to one embodiment of the present invention. The PEH will be included in the MAC PDU with AGMH if the MAC PDUs or MAC SDUs fragment of both are packed in the transport connection in the MAC PDU.

TABLE 16

| Syntax | Size (bits) | Notes |
|---|---|---|
| PEH ( ){<br>Type | 4 | Fragmentation extended header type |
| FC | 2 | Fragmentation control information |
| SN | 10 | SN is maintained per connection.-For non-ARQ connection, 'SN' represents the MAC PDU payload Sequence Number and the 'SN' value increments by one for each MAC PDU.-For ARQ connection, 'SN' represents the ARQ block sequence number. |
| }<br>Else {<br>Reserved<br>}<br>Do {<br>Length | 2<br><br>11 | <br><br>Length information of MAC SDU or MAC SDU fragment in MAC PDU accompanied by a payload |
| End | 1 | Other information presence indicator-'0' bit setting: Indicates whether 'Length' field and another 'End' field are further included-'1' bit setting: Indicates 'Length' field and another 'End' field are not further included |
| } while (!End)<br>Padding<br>} | Variable | For byte alignment |

Referring to Table 16, the PEH according to one embodiment of the present invention includes an extended header type field, a fragmentation control information field including information on packet segmentation, a sequence number field including a sequence number of the corresponding MAC PDU, a length field indicating a length of SDU or SDU fragment packing the corresponding MAC PDU and a field indicating whether another information is included.

Table 17 shows another example of a packing extended header (PEH) according to one embodiment of the present invention.

TABLE 17

| Syntax | Size (bits) | Notes |
|---|---|---|
| PEH ( ){<br>Type | 4 | Packing extended header type |
| FC | 2 | Fragmentation control information |
| SN Indicator | 1 | This field indicates whether SN field is added.-'0' bit setting: No added SN field-'1' bit setting: Added SN field present |

TABLE 17-continued

| Syntax | Size (bits) | Notes |
| --- | --- | --- |
| If (SN Indicator==1){ | | |
| SN | 10 | SN is maintained per connection.-For non-ARQ connection, 'SN' represents the MAC PDU payload Sequence Number and the 'SN' value increments by one for each MAC PDU.-For ARQ connection, 'SN' represents the ARQ block sequence number. |
| } | | |
| Else { | | |
| Reserved | 2 | |
| } | | |
| Do { | | |
| Length | 11 | Length information of SDU or segmented SDU in MAC PDU accompanied by payload |
| End | 1 | Other information presence indicator-'0' bit setting: Indicates whether 'Length' field and another 'End' field are further included-'1' bit setting: Indicates 'Length' field and another 'End' field are not further included |
| } while (!End) | | |
| Padding | Variable | Padding bits included for byte alignment |
| } | | |

Referring to Table 17, a packing extended header according to another embodiment of the present invention includes an extended header type field, a fragmentation control information field including information on packet segmentation, and a sequence number indicator field indicating whether an additional sequence number is included.

In case that a SPMH is included in a corresponding MAC PDU, the packing extended header according to another embodiment of the present invention is able to include the above-mentioned fields only.

On the contrary, in case that an AGMH is included in a corresponding MAC PDU, a packing extended header according to another embodiment of the present invention is able to further include a sequence number field including a sequence number of the corresponding MAC PDU, a length field indicating a length of SDU or SDU fragment of the corresponding MAC and a field indicating whether another information is further included.

Thus, according to the embodiments of the present invention, it is able to randomly use one of an efficient FPEH, a FEH and a PEH of 1 byte, each of which includes field(s) necessary according to a MAC header type used by MAC PDU. One example of a transmitting device for generating the MAC PDU is described with reference to FIG. 12 as follows.

Figure 12:
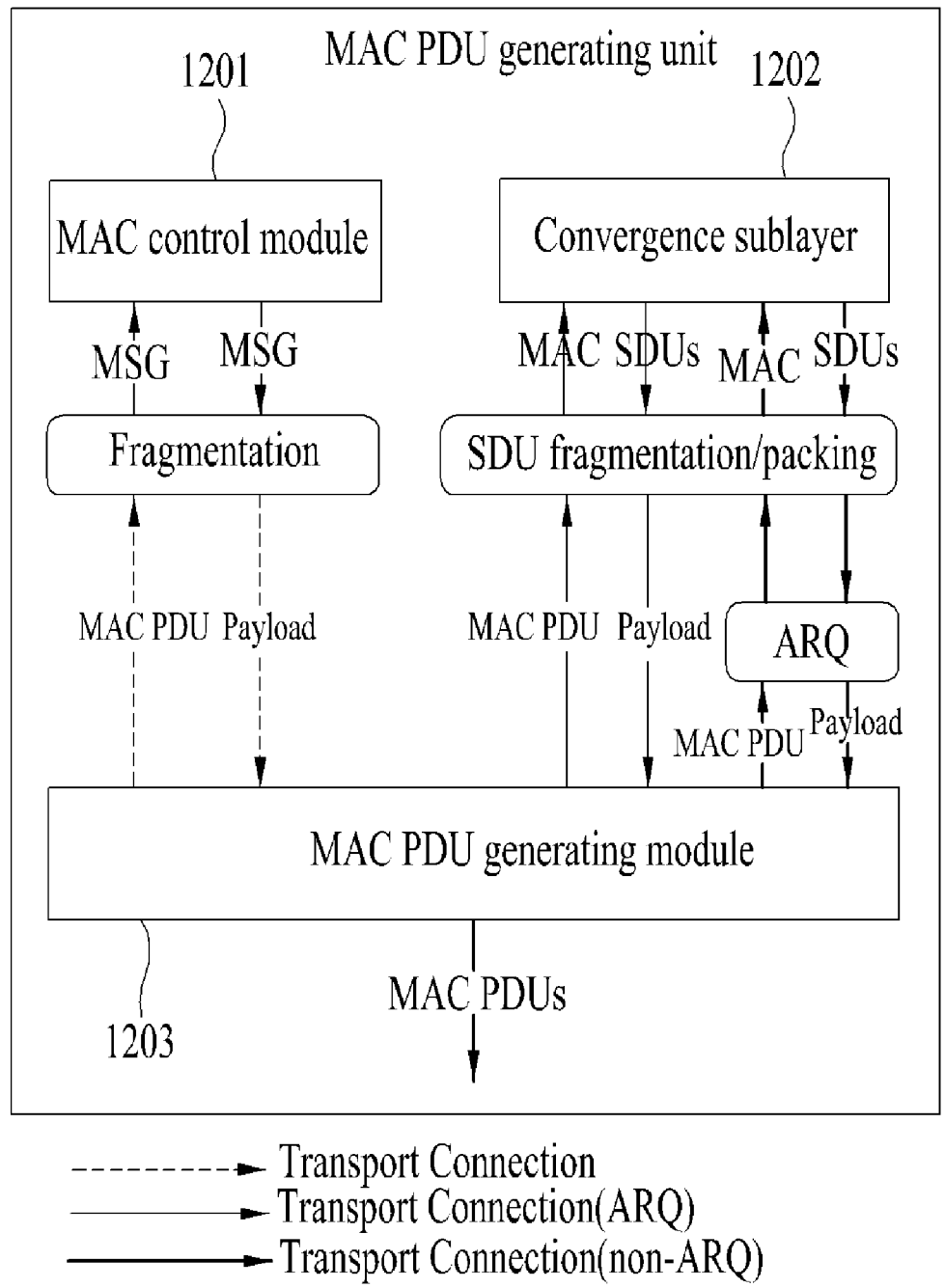
FIG. 12 is a diagram for one example of a MAC PDU generating unit in a transmitting device according to another embodiment of the present invention.

FIG. 12 is a diagram for one example of a MAC PDU generating unit in a transmitting device according to another embodiment of the present invention. In particular, FIG. 12 shows a process for generating MAC PDU used for ARQ connection, non-ARQ connection or control connection.

Referring to FIG. 12, a MAC PDU generating unit in a transmitting device can include a MAC control module 1201, a convergence sublayer 1202 and a MAC PDU generating module 1203.

MAC control messages generated from the MAC control module 1201 are fragmented into MAC PDU accompanied by a payload and can be then delivered to the MAC PDU generating module 1203. Moreover, control informations required for generating a signaling header can be transmitted to the MAC PDU generating module 1203 as well.

The convergence sublayer 1202 performs a function of converting or mapping data, which is to be transmitted, to MAC SDU. In particular, the convergence sublayer 1202 classifies MAC SDUs into a MAC SDU to transmit and a transmitted MAC SDU. Once related to a specific MAC connection, at least one upper layer PDU should be compressed into a type of MAC SDU. This SDU to enter a network can be classified by the convergence sublayer 1202 into at least one set according to a prescribed mapping reference. The convergence sublayer is able to perform header compression on at least one header included in the generated MAC SDU. The convergence sublayer 1202 delivers the MAC SDU to transmit to the MAC PDU generating module 1203 and is able to provide information (e.g., length information, etc.) required for the header generation of the MAC PDU to transmit as well.

The at least one MAC SDU generated by the convergence sublayer 1202 is converted to a MAC PDU payload via fragmentation or packing. The converted at least one MAC PDU payload is then delivered to the MAC PDU generating module. In this case, the MAC PDU payload can be classified according to a case of applying ARQ or a case of not applying ARQ.

The MAC PDU generating module 1203 generates MAC PDU including the MAC PDU payload delivered from the MAC control module 1201 or the convergence sublayer 1202 and is able to include a MAC header generating unit and a multiplexer. In this case, a MAC header generated by the MAC header generating unit can include at least one of a generic MAC header described with reference to Table 1, a SPMH described with reference to Table 2 and an extended SPMH described with reference to Table 6. Moreover, the MAC header generating unit generally generates a necessary extended header according to a type and transmission scheme of a packet to transmit via MAC PDU and is able to generate FPEHs according to embodiments of the present invention. In particular, the MAC header generating unit is able to generate the MAC PDUs described with reference to FIGS. 7 to 11.

Meanwhile, the multiplexer generates and outputs MAC PDU by multiplexing the received MAC header and MAC SDUs received in order under the control of the header generating unit.

In doing so, the MAC PDU generating module 1203 is able to perform encryption on the MAC PDU. In particular, the MAC PDU generating module 1203 further attaches PN and ICV to the generated MAC PDU or is able to attach CRC to the generated MAC PDU.

Afterwards, the generated MAC PDU is generated into at least one contiguous MAC PDU, is delivered to a physical layer, and is then externally transmitted.

Figure 13:
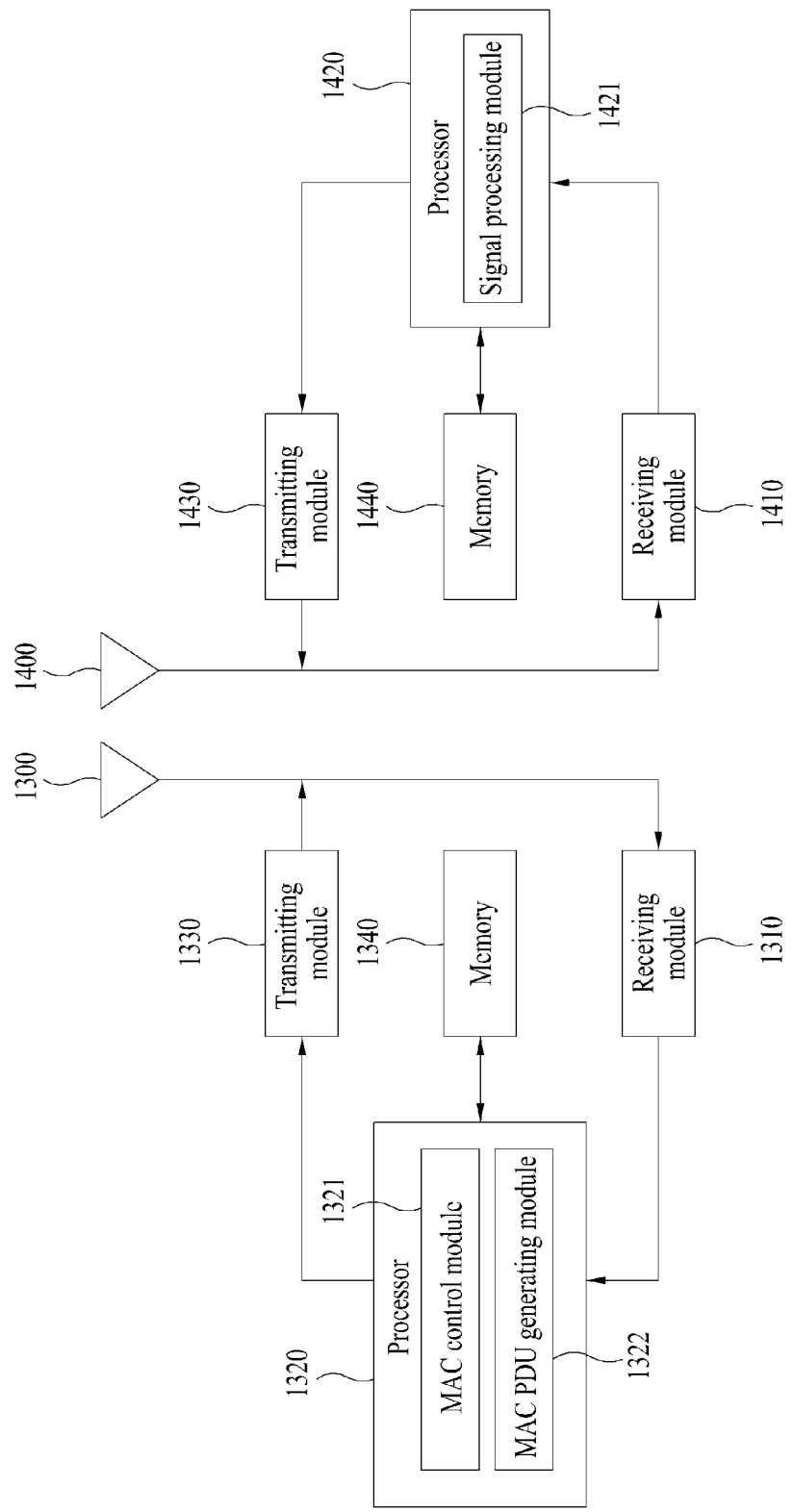
FIG. 13 is a block diagram for describing a mobile station and a base station according to a further embodiment of the present invention for performing the above described embodiments of the present invention.

FIG. 13 is a block diagram for describing a mobile station and a base station according to a further embodiment of the present invention for performing the above described embodiments of the present invention.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information and/or data.

Each of the transmitter and the receiver can include a processor, a module, a part and/or a means for performing embodiments of the present invention. In particular, each of the transmitter and the receiver can include a module (means) for encrypting a message, a module for interpreting the encrypted message, an antenna for transceiving the message and the like.

Referring to FIG. 13, a left side indicates a configuration of a transmitter, while a right side indicates a configuration of a receiver. Each of the transmitter and the receiver includes an antenna 1300/1400, a receiving module 1310/1410, a processor 1320/1420, a transmitting module 1330/1430, and a memory 1340/1440.

The antenna 1300/1400 includes a receiving antenna performing a function of receiving a radio signal externally and then delivering the received radio signal to the receiving module 1310/1410 and a transmitting antenna externally transmitting a signal generated from the transmitting module 1330/1430. In case that a multiple-antenna (MIMO) function is supported, at least two antennas 1300/1400 can be provided.

The receiving module 1310/1410 reconstructs the radio signal received externally via the antenna 1300/1400 into original data in a manner of performing decoding and demodulation on the received radio signal and is then able to deliver the reconstructed original data to the processor 1320/1420. Alternatively, the receiving module and the antenna can be represented as a receiving unit configured to receive a radio signal instead of being separated from each other, as shown in FIG. 13.

The processor 1320/1420 generally controls overall operations of the mobile/base station. In particular, the processor 1020/1030 is able to perform a control function for performing the above-described embodiments of the present invention, a MAC (medium access control) frame variable control function according to service characteristics and propagation environment, a handover function, an authentication function, an encryption function and the like.

The transmitting module 1330/1430 performs prescribed coding and modulation on a signal and/or data, which is scheduled by the processor 1320/1420 and will be then transmitted externally, and is then able to deliver the coded and modulated signal and/or data to the antenna 1300/1400. Alternatively, the transmitting module and the antenna can be represented as a transmitting unit configured to transmit a radio signal instead of being separated from each other, as shown in FIG. 13.

The memory 1340/1440 can store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 1340/1440 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The processor 1320 of the transmitter performs overall control operations on the transmitter and is able to include a MAC PDU generating module 1321 configured to generate MAC PDU. Moreover, since the processor 1320 of the transmitter corresponds to the MAC PDU generating unit described with reference to FIG. 12, the redundant description shall be omitted from the following description.

The receiver receives a service connection request message sent by the transmitter via the receiving module 1410 and then forwards the received message to the processor 1420.

The processor 1420 of the receiver performs overall control operations on the receiver and is able to include a signal processing module 1421 configured to perform processing on a signal received from the transmitter. In this case, the signal processing module 1421 is able to perform a signal processing procedure on a MAC PDU accompanied by a payload fragmented according to one of embodiments of the present invention by a method according to a MAC header type.

A mobile station used for embodiments of the present invention can include a low-power RF/IF (radio frequency/intermediate frequency) module as well as the MAC PDU generating unit. And, the mobile station can include means, modules, parts and/or the like for performing a controller function for performing the above-described embodiments of the present invention, a MAC (medium access control) frame variable control function according to a service characteristic and electric wave environment, a handover function, an authentication and encryption function, a packet modulation/demodulation function for data transmission, a fast packet channel coding function, a real-time modem control function, and the like.

A base station is able to transmit data received from an upper layer to a mobile station. The base station can include a low-power RF/IF (radio frequency/intermediate frequency) module. And, the base station can include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

Industrial Applicability

Accordingly, the present invention is applicable to various wireless communication systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparently understood that an embodiment is configured by combining claims failing to have relation of explicit citation in the appended claims together or can be included as new claims by amendment after filing an application.

The invention claimed is:

1. A method of receiving data by a receiving side in a wireless communication system, the method comprising the steps of:
   receiving a medium access control protocol date unit (MAC PDU) from a transmitting side, the MAC PDU including:
      at least one of the two or more fragments fragmented from a data block by the transmitting side,
      a first header containing control information about the MAC PDU which includes the at least one of the two or more fragments, and
      a fragmentation extended header (FEH) providing information on the data packet fragment,
      wherein the first header contains an indicator indicating that the FEH is present following the first header,
      wherein the FEH contains a type field identifying a type of the FEH and the FEH has a variable length depending on whether the fragmented data packet is a real-time data packet or not, and
      wherein the FEH has a shorter length when the fragmented data packet is the real-time data packet than when the fragmented data packet is a non-real-time data packet; and
   decoding the received MAC, PDU.

2. A receiver for receiving data from a transmitting side in a wireless communication system, the receiver comprising:
   a receiving module configured to receive a medium access control protocol data unit (MAC PDU) from the transmitting side, the MAC PDU including:
      at least one of the two or more fragments fragmented from a data block by the transmitting side,
      a first header containing control information about the MAC PDU which includes the at least one of the two or more fragments, and
      a fragmentation extended header (FEH) providing information on the data packet fragment,
      wherein the first header contains an indicator indicating that the FEH is present following the first header,
      wherein the FEH contains a type field identifying a type of the FEH and the FEH has a variable length depending on whether the fragmented data packet is a real-time data packet or not, and
      wherein the FEH has a shorter length when the fragmented data packet is the real-time data packet than when the fragmented data packet is a non-real-time data packet; and
   a processor configured to perform a signal processing operation on the received MAC PDU.

3. The method of claim 1, wherein the first header is an advance generic MAC header (AGMH) when the fragmented data packet is the non-real-time data packet.

4. The method of claim 3, wherein the AGMH includes at least one of:
   a flow identifier field including a service flow identifier (Flow ID) used for the MAC PDU transmission,
   an extended header presence indicator field indicating a presence or non-presence of the extended header in the MAC PDU, and
   a length field including length information of the MAC PDU.

5. The method of claim 1, wherein the FEH includes:
   a sequence number field indicating a sequence number of the MAC PDU,
   a length field indicating length information of the data packet fragment, and
   a field indicating whether another information is included or not.

6. The method of claim 1, wherein, if an extended header group including at least one extended header is included in the MAC PDU, the MAC PDU further includes an extended header group field indicating a length of the extended header group.

7. The method of claim 1, wherein the first header is a short-packet MAC header (SPMH) when the fragmented data packet is a real-time data packet.

8. The method of claim 7, wherein the SPMH includes at least one of:
   an extended header presence indicator field indicating a presence or non-presence of the extended header in the MAC PDU, and
   a length field including length information of the MAC PDU.

9. The receiver of claim 2, wherein the first header is a short-packet MAC header (SPMH).

10. The receiver of claim 9, wherein the SPMH includes at least one of:
    an extended header presence indicator field indicating a presence or non-presence of the extended header in the MAC PDU, and
    a length field including length information of the MAC PDU.

11. The receiver of claim 2, wherein the FEH includes:
    a sequence number field indicating a sequence number of the MAC PDU,
    a length field indicating length information of the data packet fragment, and
    a field indicating whether another information is included or not.

12. The receiver of claim 2, wherein the first header is a short-packet MAC header (SPMH) when the fragmented data packet is a real-time data packet.

13. The receiver of claim 12, wherein the SPMH includes at least one of:
    an extended header presence indicator field indicating a presence or non-presence of the extended header in the MAC PDU, and
    a length field including length information of the MAC PDU.

* * * * *